United States Patent
Logan et al.

(10) Patent No.: US 12,393,776 B2
(45) Date of Patent: *Aug. 19, 2025

(54) PROVIDING BULK SERVER-SIDE CUSTOM ACTIONS FOR MULTIPLE ROWS OF A CLIENT-SIDE SPREAD SHEET

(71) Applicant: Oracle International Corporation, Redwood Shores, CA (US)

(72) Inventors: Shaun Logan, Melrose, MA (US); Edmund A. Davis, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/503,985

(22) Filed: Nov. 7, 2023

(65) Prior Publication Data

US 2024/0080354 A1 Mar. 7, 2024

Related U.S. Application Data

(63) Continuation of application No. 16/917,384, filed on Jun. 30, 2020, now Pat. No. 11,848,976.

(51) Int. Cl.
| | |
|---|---|
| *G06F 3/0482* | (2013.01) |
| *G06F 40/18* | (2020.01) |
| *H04L 67/51* | (2022.01) |
| *H04L 67/02* | (2022.01) |

(52) U.S. Cl.
CPC ............ *G06F 40/18* (2020.01); *G06F 3/0482* (2013.01); *H04L 67/51* (2022.05); *H04L 67/02* (2013.01)

(58) Field of Classification Search
CPC ......... H04W 4/14; H04W 4/08; H04W 8/186; G06F 3/0481; G06F 3/0482
See application file for complete search history.

(56) References Cited

U.S. PATENT DOCUMENTS

| | | | |
|---|---|---|---|
| 7,426,688 B2 * | 9/2008 | Serra ....................... | G06F 40/18 715/267 |
| 8,713,584 B2 * | 4/2014 | Harm .................... | G06F 9/4843 719/318 |
| 2002/0129054 A1 * | 9/2002 | Ferguson ................ | H04L 67/10 715/212 |
| 2006/0224946 A1 * | 10/2006 | Barrett .................... | G06F 40/18 715/209 |

(Continued)

OTHER PUBLICATIONS

Excel VBA Macro combing through 80,000+ rows of data taking 23 hours to complete, Jul. 12, 2017, retrieved from—https://stackoverflow.com/questions/45060080/excel-vba-macro-combing-through-80-000-rows-of-data-taking-23-hours-to-complete, 8 pages (Year: 2017).*

(Continued)

*Primary Examiner* — Yongjia Pan
(74) *Attorney, Agent, or Firm* — Trellis IP Law Group, PC

(57) ABSTRACT

Server-side custom actions are associated with data fields. The data fields are associated with multiple rows of a client-side spread sheet. The server-side custom actions are defined by one or more web services. Input is received into the data fields of the client-side spread sheet. The input from the data fields is transmitted in a single request to the one or more web services. Results of the server-side custom actions are received. The results are displayed in the client-side spread sheet.

18 Claims, 15 Drawing Sheets

(56) References Cited

U.S. PATENT DOCUMENTS

| | | | | |
|---|---|---|---|---|
| 2007/0150741 | A1* | 6/2007 | Kaler | H04L 63/123 713/182 |
| 2011/0040824 | A1* | 2/2011 | Harm | G06F 9/45529 726/4 |
| 2011/0041140 | A1* | 2/2011 | Harm | G06F 9/4843 709/219 |
| 2012/0144300 | A1* | 6/2012 | Harm | G06F 21/6218 715/704 |
| 2013/0179764 | A1* | 7/2013 | Battagin | G06F 40/18 715/209 |
| 2014/0136936 | A1* | 5/2014 | Patel | G06F 16/972 715/212 |
| 2014/0136937 | A1* | 5/2014 | Patel | G06F 40/18 715/212 |
| 2014/0317640 | A1* | 10/2014 | Harm | G06F 9/541 719/320 |
| 2015/0193421 | A1* | 7/2015 | Chitilian | G06F 40/18 715/217 |
| 2016/0055140 | A1* | 2/2016 | McKenzie | G06F 40/186 715/212 |
| 2019/0095226 | A1* | 3/2019 | Saunders | G06F 8/61 |

OTHER PUBLICATIONS

How to start two VBA Macros at once when different trigger cells are changed via formula?, May 7, 2019, retrieved from—https://stackoverflow.com/questions/56020377/how-to-start-two-vba-macros-at-once-when-different-trigger-cells-are-changed-via, 4 pages (Year: 2019).*

Excel VBA launch multiple macros at the same time, May 24, 2015, retrieved from—https://stackoverflow.com/questions/30423205/excel-vba-launch-multiple-macros-at-the-same-time, 4 pages (Year: 2015).*

How do I automatically trigger the macros when value change occur in cell, Jun. 17, 2019, retrieved from—https://www.codeproject.com/Questions/5057274/How-do-I-automatically-trigger-the-macros-when-val, 2 pages (Year: 2019).*

How to trigger macros when clicking on a specific cell, Sep. 17, 2019, retrieved from—https://stackoverflow.com/questions/57976431/how-to-trigger-macros-when-clicking-on-a-specific-cell, 4 pages (Year: 2019).*

Condition to Run Macro based on Cell Value, Jan. 8, 2020, retrieved from—https://stackoverflow.com/questions/59653818/condition-to-run-macro-based-on-cell-value, 2 pages (Year: 2020).*

* cited by examiner

*Table Column Manager* ~52

Available Fields ~56 | Custom Actions ~58

~60

Business Object

▶ Communicate ~62
   ☐ Force Comm. Flag ~70
▶ Submit ~64
   ☑ Bypass? ~72
▶ Renumber PO ~66
   ☑ New Order Number ~74
▶ Close PO ~68
   ☑ Action ~76
   ☑ Reason ~78

Selected Fields ~54

| Field Title ~80 | Field ID ~82 |
|---|---|
| New Order Number (Renumber PO) ~84 | newOrderNumber ~86 |
| ~88 | |
| Acknowledgement Due Data | AcknowledgementDueDate |
| Payment Terms ID | PaymentTermsID |
| Payment Terms | PaymentTerms |
| Carrier ID | CarrierID |
| Name | Carrier |
| Mode of Transport Code | ModeofTransportCode |
| Shipping Method | ShippingMethod |
| Freight Terms | FreightTermsCode |
| ... | |

Spreadsheet UI

| File | Home | Insert | Page Layout | Formulas | Data | Review | View | Builder |

Download Changes   Upload Changes   Table Column Manger +

| | A | B | C | D | E | F | G | H | I | J |
|---|---|---|---|---|---|---|---|---|---|---|
| 0 | | Change\| Status | New Order Number (Renumber PO) | PO Header ID* | Order Number* | Reason (Close) | Action (Close) | Bypass? (Submit) | Total | Currency |
| 1 | | Renumber PO \| | | 30010001218 | 31 | | | | 47.60 | EUR |
| 2 | | Submit \| | | 30010001219 | 21 | | | | 39.98 | USD |
| 3 | | Update \| | | 30010001220 | 2 | | | | 11.90 | USD |
| 4 | | | | 30010001221 | 10 | | | | 23.80 | USD |
| 5 | | Close | | 30010001222 | 6 | per Larry | close | | 39.98 | EUR |
| 6 | | Close | | 30010001223 | 11 | per Larry | close | | 21.95 | USD |
| 7 | | Close | | 30010001224 | 32 | per Larry | close | | 100.10 | EUR |
| 8 | | Close | | 30010001225 | 40 | per Larry | close | | 99.80 | USD |
| 9 | | Close | | 30010001226 | 38 | per Larry | close | | 259.87 | USD |

FIG. 6

PROVIDING BULK SERVER-SIDE CUSTOM ACTIONS FOR MULTIPLE ROWS OF A CLIENT-SIDE SPREAD SHEET

CROSS REFERENCES TO RELATED APPLICATIONS

This application is a continuation of the following application, U.S. patent application Ser. No. 16/917,384, entitled CUSTOM ACTION INVOCATION IN A SPEADSHEET INTEGRATED WITH WEB SERVICES, filed on Jun. 30, 2020, which is hereby incorporated by reference as if set forth in full in this application for all purposes.

This application is related to the following application, U.S. patent application Ser. No. 16/145,029, entitled EDITABLE TABLE IN A SPREADSHEET INTEGRATED WITH A WEB SERVICE, filed on Sep. 27, 2018 (Trellis Ref. ORACP0205/ORA180186-US-NP), which is hereby incorporated by reference as if set forth in full in this application for all purposes.

This application is further related to the following U.S. Patent Applications: U.S. patent application Ser. No. 16/692,634, entitled TABLE CELL EDITING IN EXCEL CONSTRAINED TO UNBOUNDED AND SEARCHABLE LISTS OF VALUES FROM WEB SERVICE, filed on Nov. 22, 2019 (Trellis Ref. ORACP0205CIP1/ORA200010-US-CIP-1); and U.S. patent application Ser. No. 16/560,201, entitled ADAPTIVE AUTHENTICATION IN SPREADSHEET INTERFACE INTEGRATED WITH WEB SERVICE, filed on Sep. 4, 2019 (Trellis Ref. (ORACP0245/ORA190245-US-NP), which are hereby incorporated by reference as if set forth in full in this application for all purposes.

BACKGROUND

The present application relates to computing, and more specifically to software, systems, and methods for using client-side software applications and accompanying User Interfaces (UIs) to use and/or interact with server-side computing resources, e.g., data and/or functionality.

Software and accompanying UIs for interacting with server-side computing resources are employed in various demanding applications, including mobile apps and accompanying UIs for enabling access to cloud-based enterprise software and associated data and functionality; enabling user access to online financial accounts and associated data, and so on. Such applications often demand user-friendly, feature-rich interfaces that enable users to quickly complete tasks, such as launching business processes, requesting adjustments to financial accounts, and so on.

Feature rich, user friendly UIs and associated functionality can be particularly important in enterprise applications, which may involve large amounts of server-side data and associated functionality, e.g., business processes and associated web services or Application Programming Interfaces (APIs).

Conventionally, a user may employ a browser and/or mobile app to browse to a particular website, and then login to the website to access a website UI for interacting with the associated server-side computing resources. However, the UIs often provide limited functionality, which can be problematic in cases requiring substantial understanding of the server-side data and requiring substantial functionality for manipulating the data or otherwise using server-side functionality, e.g., as provided via web services and accompanying business logic, etc.

SUMMARY

Various embodiments discussed herein enable client-side spreadsheets to use server-side functionality, e.g., custom actions accessible via one or more via web services, in combination with preexisting client-side functionality, e.g., spreadsheet functionality. Client-side spreadsheets may now cause execution of arbitrary server-side business logic (that may be provided via a web service or Application Programming Interface (API)) in communication with a specialized spread-sheet add-in that facilitates communications between (e.g., integration between) the spreadsheet and the server-side functionality.

Entries in fields of the spreadsheet that have been associated with one or more custom actions may be packaged into payloads that are then sent to the appropriate web service or API that implements the associated custom actions in response to receipt of the payloads. The payloads act as inputs to drive behaviors of the custom actions.

An example method for employing a client-side spreadsheet to use server-side software functionality includes determining that one or more fields of the client-side spreadsheet have been associated with a custom action; receiving input into one of the one or more fields, resulting in received input; and incorporating the received input into one or more input payloads for input into server-side business logic for implementing the custom action.

In a more specific embodiment, the example method further includes implementing the server-side business logic via one or more web services. The business logic specifies one or more custom actions to be implemented via the one or more web services.

The one or more custom actions include launching a server-side process-based software application. Execution of the process-based software application may include or involve, for instance, the launching and running of an approval process, such as an approval process for submitting a purchase order, adjusting an employee salary, etc.

The example method may further include using a client-side spreadsheet add-in to package and submit one or values in the one or more fields as one or more input parameters to the one or more web services.

The server-side business logic may be invoked by submitting the one or more input parameters to the one or more web services. Results of the processing by the server-side business logic may be displayed in the spreadsheet via one or more indications, after the server-side business logic completes operations in response to receipt of the one or more input parameters.

The spreadsheet may provide one or more first UI controls for enabling a user to select multiple rows of the spreadsheet, and then submit, simultaneously, data in the multiple rows as input to one or more web services implementing one or more custom actions. One or more second UI controls may enable a user to mark plural rows for use with a custom action of the one or more custom actions. In addition, the spreadsheet add-in may automatically mark a row of the spreadsheet for use with a specific custom action based upon one or more properties of a field that a user selects to perform data entry.

Accordingly, in addition to enabling spreadsheet interaction with server-side data (also simply server-side data resources), such as via Create, Retrieve, Update and Delete (CRUD) operations, certain embodiments discussed herein further enable use of the spreadsheet to call additional server-side functionality, e.g., business logic, which may be implemented via one or more web services or APIs.

The server-side business logic may implement additional actions, as opposed to simply data manipulations and synchronization of client-side data with server-side data. For instance, the actions may facilitate manipulation of the order of rows in a server-side table. For example row re-ordering can be specified in the spreadsheet before the associated business logic is called to reorder the rows in the server-side table included among the server-side data.

Accordingly, additional actions can be called to manipulate server-side resources (e.g., data and functionality) via custom web services (e.g., REST APIs) configured to operate on the server-side resources. One or more web services or APIs of the business logic may expose the server-side resources (data and functionality) for operations to be implemented via the webs services in response to authenticated requests (e.g., from client-side spreadsheets) issued thereto.

This client-side functionality for using various server-side web services to implement custom actions or arbitrary server-side logic (and not just for data manipulations) may significantly enhance business task completion efficiency and associated task-completion times, as discussed more fully below.

Accordingly, certain embodiments discussed herein enable use of client-side software, e.g., spreadsheets, such as Microsoft Excel®, to not only specifically create, retrieve, update, and delete associated server-side data, the data of which can then be synchronized with client-side data (e.g., in accordance with the above-identified and incorporated U.S. Patent Application, entitled TABLE CELL EDITING IN EXCEL CONSTRAINED TO UNBOUNDED AND SEARCHABLE LISTS OF VALUES), but to enable calling other server-side functionality, such as process-based software applications or other server-side logic.

Note that although reference may be made to specific types of spreadsheet programs, e.g., Microsoft Excel, Google Sheets, Open Office, etc., it should be apparent that features of the embodiments can be adapted for use with any suitable spreadsheet program.

Furthermore, note that embodiments discussed herein also enable bulk processing of spreadsheet rows. For instance, a given spreadsheet table may have thousands of rows, and thousands of rows may be selected and simultaneously used to call one or more web services. Completing such tasks using conventional UIs (e.g., webpage UIs) for interfacing with a web service can be particularly problematic, tedious, error prone, and time consuming.

Furthermore, previously, if the user wished to submit many requests to many different web services, this often required repeatedly switching client-side software applications and associated UIs, thereby causing the user to lose the current context. This time-consuming process also increased susceptibility to human error. Embodiments discussed herein overcome such shortcomings with previous approaches to use of server-side functionality.

A further understanding of the nature and the advantages of particular embodiments disclosed herein may be realized by reference of the remaining portions of the specification and the attached drawings.

BRIEF DESCRIPTION OF THE DRAWINGS

FIG. 2 illustrates a first example User Interface (UI) display screen for configuring the spreadsheet for use with example custom actions, and identifying spreadsheet fields that have been associated with an example custom action.

FIG. 6 illustrates a fifth example UI display screen showing a bulk copy and paste operation, where a custom action associated with a particular copied row automatically applies to the pasted rows.

DETAILED DESCRIPTION OF EMBODIMENTS

Figure 1:
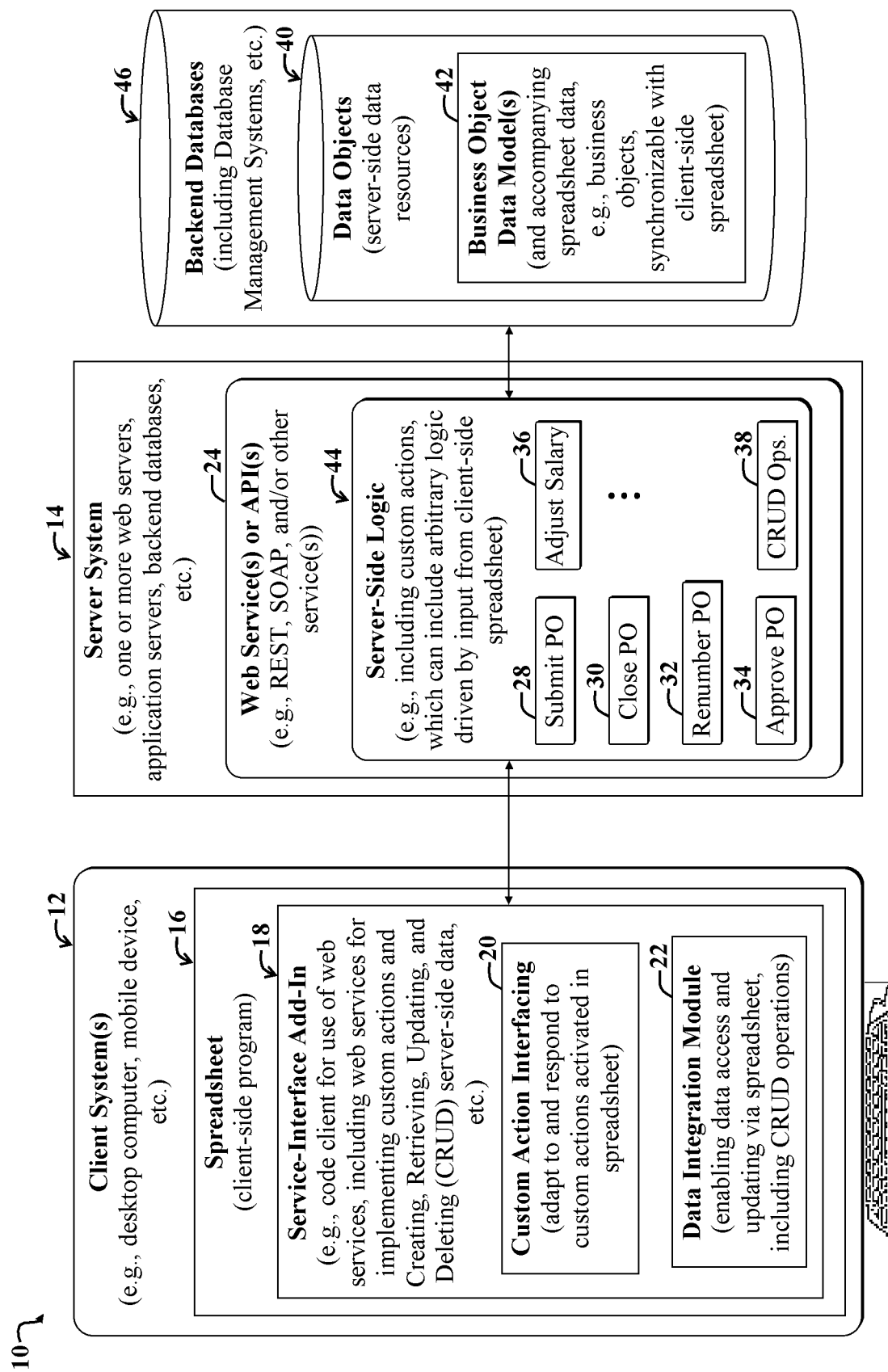
FIG. 1 illustrates a first example system and accompanying computing environment employing a client-side spreadsheet add-in for interacting with web services to not only Create, Retrieve, Update, and Delete (CRUD operations) server-side data, but to implement custom actions, such as actions implemented via process-based applications, that use data from the client-side spreadsheet as input.

Generally, software developers, configuration managers, deployment managers, and other users of a computing environment may subscribe to certain cloud services to facilitate development, configuration, and deployment of software applications and storage of associated files.

For the purposes of the present discussion, a server may be any computing resource, such as a computer and/or software that is adapted to provide content, e.g., data and/or functionality, to another computing resource or entity that requests it, i.e., the client. A client may be any computer or system, including software system that is adapted to receive content from another computer or system, called a server. A server system may be any collection of one or more servers and accompanying computing resources. The terms "client device" and "client" may be employed interchangeably herein, however, depending upon the context in which the term is used, the term client may refer more generally to both client devices and client software.

A computing environment may be any collection of computing resources used to perform one or more tasks involving computer processing. A computer may be any processor in communication with a memory. A computing resource may be any component, mechanism, or capability or quantities thereof of a computing environment, including, but not limited to, processors, memories, software applications, user input devices, and output devices, servers, and so on. Examples of computing resources include data and/or software functionality offered by one or more web services, Application Programming Interfaces (APIs), etc.

An enterprise computing environment may be any computing environment used for a business or organization. An example enterprise computing environment includes various computing resources distributed across a network and may further include private and shared content on Intranet Web servers, databases, files on local hard discs or file servers, email systems, document management systems, portals, and so on.

A given software application may include (but not necessarily) constituent software applications or modules (e.g., services, functions, procedures, computing objects, etc.). Accordingly, the term "software application" may also include networked software applications or integrated groups thereof.

For the purposes of the present discussion, a software system may be any collection of computing resources implementing machine-readable instructions, i.e., computer code. Accordingly, the term "software system" may refer to a software application, and depending upon the context in which the term is used, may further refer to the accompanying computer(s) and associated computing resources used to run the software application.

Depending upon the context in which the term is used, a software system may further include hardware, firmware, and other computing resources enabling running of the software application. Note that certain software systems may include collections of disparate services, which are implemented in particular sequences in accordance with a process template and accompanying logic. Accordingly, the terms "software system," "system," and "software application" may be employed interchangeably herein to refer to modules or groups of modules or computing resources used for computer processing.

For the purposes of the present discussion, a web service may be any computer code and associated functionality that is adapted to be called by an application or other service or process whose code is stored in a separate location (e.g., on another computer or memory storage location or device) from the web service. Accordingly, the term "service" as used herein is relatively broad and may include remotely accessible APIs and services characterized by Web Services Description Language (WSDL) interfaces, Simple Object Access Protocol (SOAP), REpresentational State Transfer (REST), YAML (Yet Another Markup Language), and/or other types of interfaces.

Generally, web services, also simply called services herein, provide functionality, e.g., capabilities, that may be reused by different applications, processes, or web services (that may be distributed across a network), which access the functionality via a service interface (e.g., WSDL interface) consistent with a description of the web service. A web services model may represent a loosely coupled integration model for allowing flexible integration of various network-distributed applications or processes.

Embodiments discussed herein generally related to systems and methods for using software (called client-side software herein) running on a desktop computer, mobile device, or other computer system to authenticate with and access data, update, or otherwise use any functionality provided by web services, e.g., REpresentational State Transfer (REST) services or Application Programming Interfaces (APIs)

For the purposes of the present discussion, a custom action may be any software action implemented via code that has been developed or modified for a particular customer. Depending upon the context in which the term is used, the term custom action may refer to the software action or the code that implements the software action.

Note that while various embodiments discuss use of server-side custom actions, embodiments are not limited thereto. For instance, the server-side actions leveraged by embodiments discussed herein may include or represent arbitrary logic (not necessarily custom code or logic) that may be driven via input and communications from a client-side spread sheet add-in.

A software action may be any process or collection of processes or operations implemented via software. Additional examples of processes include updating or editing data in a database, placing a product order, creating an opportunity business object, creating a business contact object, adding a revenue line to a business object, displaying data visualizations or analytics, triggering a sequence of processes, launching an enterprise software application, displaying a dialog box, implementing a step of a process-based software application and so on. The terms "software action" and "action" are employed interchangeably herein.

Certain embodiments discussed herein are particularly useful for enabling use of client-side spreadsheets, such as Excel, to provide input (including bulk input and implementing bulk operations) to server-side process-based software applications, thereby launching/driving the process-based software applications.

A spreadsheet may be any software application, such as Microsoft Excel®, or other spreadsheet, for facilitating organization and use of data via tables. Depending upon the context in which the term is used, a spreadsheet may also refer to a document produced by the software application, or may refer to a table shown in a UI display screen of the software application. Although reference may be made to specific types of spreadsheet programs, e.g., Microsoft Excel, Google Sheets, Open Office, etc., it should be apparent that features of the embodiments can be adapted for use with any suitable spreadsheet program.

A process-based software application may be any software application definable by one or more sequences of steps, also called software activities. A sequence of steps (e.g., as may be involved in an approval flow, for instance)

of a process-based software application may be called a process flow. Process flows are often modeled and illustrated via swim lanes in a User Interface (UI) display screen. Process-based applications are often implemented via composite applications that may leverage different web services for different process steps.

Software functionality may be any function, capability, or feature, e.g., stored or arranged data, that is provided via computer code, i.e., software. Generally, software functionality may be accessible via use of a user interface and accompanying user interface controls and features. Software functionality may include actions, such as retrieving data pertaining to a computing object (e.g., business object); performing an enterprise-related task, such as promoting, hiring, and firing enterprise personnel, placing orders, calculating analytics, launching certain dialog boxes, performing searches, and so on.

For clarity, certain well-known components, such as the Internet, hard drives, processors, power supplies, routers, Internet Service Providers (ISPs), workflow orchestrators, process schedulers, identity management clouds, process clouds, certificate authorities, business process management systems, database management systems, middleware, database management systems, and so on, are not necessarily explicitly called out in the figures. However, those skilled in the art with access to the present teachings will know which components to implement and how to implement them to meet the needs of a given implementation.

FIG. 1 illustrates a first example system 10 and accompanying computing environment employing a client-side spreadsheet add-in 18 for interacting with web services 24 to not only Create, Retrieve, Update, and Delete (called CRUD operations) server-side data 40, 42, but to implement custom actions, such as process-based software applications, that use data from the client-side spreadsheet 16 as input.

The first example system 10 includes one or more client systems 12 in communication with a server system 14 via network, such as the Internet. The server system 14 may selectively provide access to data objects 40 and accompanying spreadsheet data 42 of the backend databases 46, via one or more web services and/or Application Programming Interfaces (APIs) 24.

Note that in general, groupings of various modules of the system 10 are illustrative and may vary, e.g., certain modules may be combined with other modules or implemented inside of other modules, or the modules may otherwise be distributed differently (than shown) among a network or within one or more computing devices or virtual machines, without departing from the scope of the present teachings. For example, while the backend databases 46 are shown separately from the server system 14, the backend databases 46 may be part of the server system 14, without departing from the scope of the present teachings.

The example client system 12 includes a spreadsheet 16 (also called the client-side program herein) and accompanying service-interface add-in 18 (also spreadsheet add-in or, simply, add-in herein). The add-in 18 includes code enabling the spreadsheet 16 to access and use the web services 24 and accompanying server-side logic 44. Note that use of a spreadsheet add-in to facilitate CRUD operations is discussed more fully in the above-identified and incorporated US Patent Applications.

The add-in 18 includes a custom action interfacing module 20 and a data integration module 22. The data integration module 22 includes code for facilitating communications (e.g., CRUD operations) between the client-side spreadsheet 16 and corresponding business object data model 42, via one or more web services 24, e.g., a CRUD operations API 38 of the server-side logic 44.

The custom action interfacing module 20 facilitates communications between the spreadsheet 16 and one or more web services 24 implementing business logic 44, e.g., corresponding to custom actions 28-36 other than the CRUD operations of the API 38. Examples of web services or APIs corresponding to and/or implementing custom actions include a submit Purchase Order (PO) web service 28, a close PO web service 30, a renumber PO web service 32, an approve PO service 34, and a adjust salary web service 36.

Accordingly, the server-side logic 44 includes not just CRUD operations web services 38 and associated functionality, but further includes various other example web services 28-36 for implementing custom actions or other server-side logic (e.g., which may represent a function, procedure, process, or other code that can accept one or more parameters or arguments as input; then implement processing based on the inputs in accordance with the logic implemented via the code).

Note that the server system 14 and accompanying backend databases 46 implement a cloud or portion thereof. Accordingly, the server-side business object data model 42 is also called cloud-based data or a collection of cloud-based resources, e.g., data resources.

In the present example embodiment, the example submit PO web service 28 implements a "custom action" involving a process involving submitting a PO through an approval process, e.g., a process-based software application, which may be implemented using Business Process Execution Language (BPEL) and described using Business Process Modelling Notation (BPMN).

If the user submitting the PO using the submit PO web service 28 has logged into the server system 14 using credentials with permissions to effectuate PO submittal without further approvals, then the submit PO web service 28 may simply update the business object data model 42 with information indicating that the associated PO has been submitted, while sending the PO to the appropriate recipient, such that the PO has been "submitted."

Note that, in the present example embodiment, "submit" custom action implemented by the submit PO web service 28 is initiated from the spreadsheet 16 via use of the add-in 18 and accompanying custom action interfacing module 20. Certain fields in the spreadsheet 16 are associated with the "submit" custom action. Data or instructions in such fields represent input parameters for arguments exposed by the submit PO web service 28 for use by the spreadsheet add-in 18.

Upon submittal of inputs to the submit PO web service 28, via the spreadsheet 16 and accompanying custom action interfacing module 20, the submit PO web service 28 implements its associated logic and returns a status, e.g., the status specifying whether or not the associated process has succeeded or not, as discussed more fully below.

Similarly the close PO web service 30, renumber PO web service, approve PO web service, adjust salary web service 36, and so on, may operate similarly, to the extent that a user of the spreadsheet 16 may launch the web services 28-36 by submitting data or instructions from fields of the spreadsheet 16 that have been specifically associated with one or more of the web services 28-36.

Note that use of certain fields of the spreadsheet 16 as input parameters to the web services 28-36 enables not only bulk operations (e.g., submittal of multiple fields, e.g., thousands of spreadsheet rows and applicable fields therein, to a particular web service), but further enables simultaneous launching and associated processing of plural web services to plural web services 28-36.

Note that spreadsheets may provide preexisting functionality, e.g., copy-and-paste features; data visualization features, and so on, which may synergistically increase the efficiency of the bulk operations and use of server-side logic 44. Simultaneous use of both the functionality of the spreadsheet 16 and server-side functionality represented by the server-side logic 44 may greatly enhance worker efficiency, especially in large enterprise use-case scenarios involving use of many web services 28-38 and/or many instances of use of a given web service.

Note that when a user employs the spreadsheet 16 to log into the server system 14, the user will be granted a certain set of permissions associated with the log-in credentials. Furthermore, the logged-in user's spreadsheet 16 will be associated with the corresponding business object data model 42. This information can inform the server-side logic 44 as to what data objects 40 the server-side logic 44 may operate on or in view of the log-in credentials and associated permissions.

In certain scenarios, the server-side logic 44 need not operate on the business object data model 42, but may launch another process that does not necessarily pertain to (or relate to) specific portions of the business object data model 42 that are integrated with or used to populate cells of the client-side spreadsheet 16, without departing from the scope of the present teachings. Accordingly, custom actions are not necessarily required to operate on server-side data that is integrated with the spreadsheet 16, but nevertheless, may do so in various embodiments and implementation scenarios.

Recall that previously (e.g., as discussed in the above-identified and incorporated US Patent Applications), data for POs, for instance, could be imported into or otherwise loaded in the spreadsheet 16. Data fields of the resulting spreadsheet could be synchronized with the business object data model 42, e.g., via CRUD operations. Embodiments discussed herein further extend such functionality to enable the running of arbitrary server-side logic 44, as driven by input from the spreadsheet 16, e.g., via the custom action interfacing module 20.

In the example use case of performing software actions related to a PO, the custom action interfacing module 20 will be informed (e.g., via manual or automatic specification) of various characteristics of the server-side logic 44 that the service-interface add-in 18 will be interacting with. For instance, each of the web services or APIs 28-38 may include online documentation specifying accepted input payloads (and detailing associated required input parameters), web service URLs (e.g., paths usable to call associated REpresentational State Transfer (REST) APIs, and so on. The custom action interfacing module 20 uses this information to selectively package data and/or instructions from the spreadsheet 16 of sending as input payloads to the different web services 28-38 as needed for a particular implementation or use-case scenario.

In summary, various embodiments discussed herein implement additional spreadsheet functionality via the service-interface add-in 18. The additional functionality facilitates integration of the spreadsheet 16 with one or more remote web service 24.

The added functionality enables configuration of the spreadsheet 16 so that users can invoke server-side custom actions or other arbitrary logic (that is accessible via one or more web services 24) against the rows of data in the spreadsheet.

Accordingly, when a user edits their business data (or other type of data) in a spreadsheet that is integrated with one or more remote web services 24 (e.g., remote data services), values in fields are sent as parameters to custom actions (and/or other types of actions) defined by the one or more remote web services 24.

Results of the custom action invocation are then shown in the spreadsheet 16. For example, business accounting users may use a spreadsheet to edit invoices or POs. In addition to standard CRUD operations these business users may wish to apply custom actions, such as "submit," "approve," "close," etc., to the invoices or POs.

Embodiments discussed herein may go beyond mere use of CRUD operations, and provides user friendly mechanisms to mark rows for various actions; specify extra values to send with each action, and to invoke the associated server-side custom actions. For instance, an invoice or PO approval action may require "justification" (or "reason") field that was not previously present in the invoice table or otherwise. Such field can be added to the spreadsheet 16 and then associated with the invoice or PO approval action.

Accordingly, certain embodiments discussed herein enable users to employ a spreadsheet to invoke one or more web service custom actions on multiple spreadsheet rows in a single request to the one or more web services 24. This may significantly enhance usability of not just functionality of the spreadsheet 16, but the server-side logic 44. This may further reduce overall time-to-completion of various types of tasks, e.g., business tasks, and may also improve computing environment performance and scalability.

FIG. 2 illustrates a first example User Interface (UI) display screen 50 for configuring the spreadsheet 16 of FIG. 1 for use with example custom actions (identified by selection items 62, 64, 66, 68) and identifying spreadsheet fields 54 that have been (or are to be) associated with an example custom action.

For the purposes of the present discussion, a UI display screen may be any software-generated depiction presented on a display. Examples of depictions include windows, dialog boxes, displayed tables, and any other graphical user interface features, such as user interface controls, presented to a user via software, such as a browser. A user interface display screen contained within a single border is called a view or window. Views or windows may include sections, such as sub-views or sub-windows, dialog boxes, graphs, tables, and so on. In certain cases, a user interface display screen may refer to all application windows presently displayed on a display.

The first example UI display screen 50 represents a table column manager that includes an available fields section 52 and an associated selected fields section 54. The available fields section 52 includes a business object tab 56 and a custom actions tab 58. The first example UI display screen 50 may be generated by the service-interface add-in 18 of FIG. 1.

The business object tab 56 is used to associate different spreadsheet fields for CRUD operations and associated use of the data integration module 22. The custom actions tab 58, which is currently selected, includes various UI controls 60, including UI controls 62-78.

For the purposes of the present discussion, a UI control may be any displayed element or component of a user interface display screen, which is adapted to enable (or facilitate) a user to provide input, view data, and/or otherwise interact with a user interface. Additional examples of user interface controls include buttons, drop-down menus, menu items, tap-and-hold functionality, and so on. Similarly, a user interface control signal may be any signal that is provided as input for software, wherein the input affects a user interface display screen and/or accompanying software application associated with the software.

The example custom action UI controls 60 include a communicate drop-down menu 62 with a force communication flag sub-control 70. The communicate drop-down menu 62 corresponds to an associated communicate custom action and associated web service that includes a force communication flag argument for accepting a force communication flag parameter from the spreadsheet 16 of FIG. 1, when one or more fields corresponding to the force communicate flag 70 are selected and added to the spreadsheet 16 of FIG. 1. Currently, the force communicate flag 70 is not selected and the associated spreadsheet 16 of FIG. 1 will not show fields corresponding to the force communicate flag 70.

Similarly, the example custom actions UI controls 60 further include a submit drop-down menu 64 with a bypass sub-control 72. The bypass sub-control 72 corresponds to an associated field that will be displayed in the spreadsheet 16 of FIG. 1, as the bypass sub-control 72 is currently selected.

Similarly, a renumber PO control 66 corresponds to a renumber PO custom action and associated web service (e.g., the web service 32 of FIG. 1). The associated renumber PO web service 32 of FIG. 1 is shown, in FIG. 2, as accepting a new order number parameter as input, where the new order number parameter corresponds to a new order number sub-control 74 of the renumber PO control 66. The new order number sub-control 74 is currently selected. Accordingly, a corresponding renumber PO field will appear in the associated spreadsheet 16 (e.g., upon selection of a control to redraw the associated spreadsheet layout), as discussed more fully below.

Similarly, an example close PO control 68 includes a currently selected action sub-control 76 and reason sub-control 78. The action sub-control 76 and reason sub-control 78 correspond to parameters that are accepted as input by the associated close PO web service 30 of FIG. 1. Furthermore, fields corresponding to the action sub-control 76 and reason sub-control 78 will appear in the associated spreadsheet 16 of FIG. 1.

In the present example embodiment, when a user checks (i.e., selects) one of the sub-controls 70-78, fields pertaining or related to the selection appear in the selected fields section 54. Currently, a user has just selected the new order number sub-control 74 of the renumber PO control 66. Accordingly, the selected fields section 54 is populated with a new order number field 84, as indicated in a field title column 80. The corresponding field ID (newOrderNumber) 86 appears in a field ID column 82. Other fields 88 that are related to a PO and may be affected by a PO number reordering process are also shown. Note that the new order number field 84 identifies the name of the associated custom action (Renumber PO) in parenthesis.

When a user then edits a field with a field ID of "newOrderNumber," the add-in of FIG. 1 will detect this editing, and then mark the associated row for the reorder PO custom action implemented via the renumber PO web service 32 of FIG. 1. Upon submittal or upload of the spreadsheet to the server system 14 and accompanying backend databases 46 by the add-in 18 of FIG. 1, entries in such "newOrderNumber" fields will be packaged and provided as input payload(s) to the associated renumber PO web service 32 of FIG. 1, as discussed more fully below.

Figure 3:
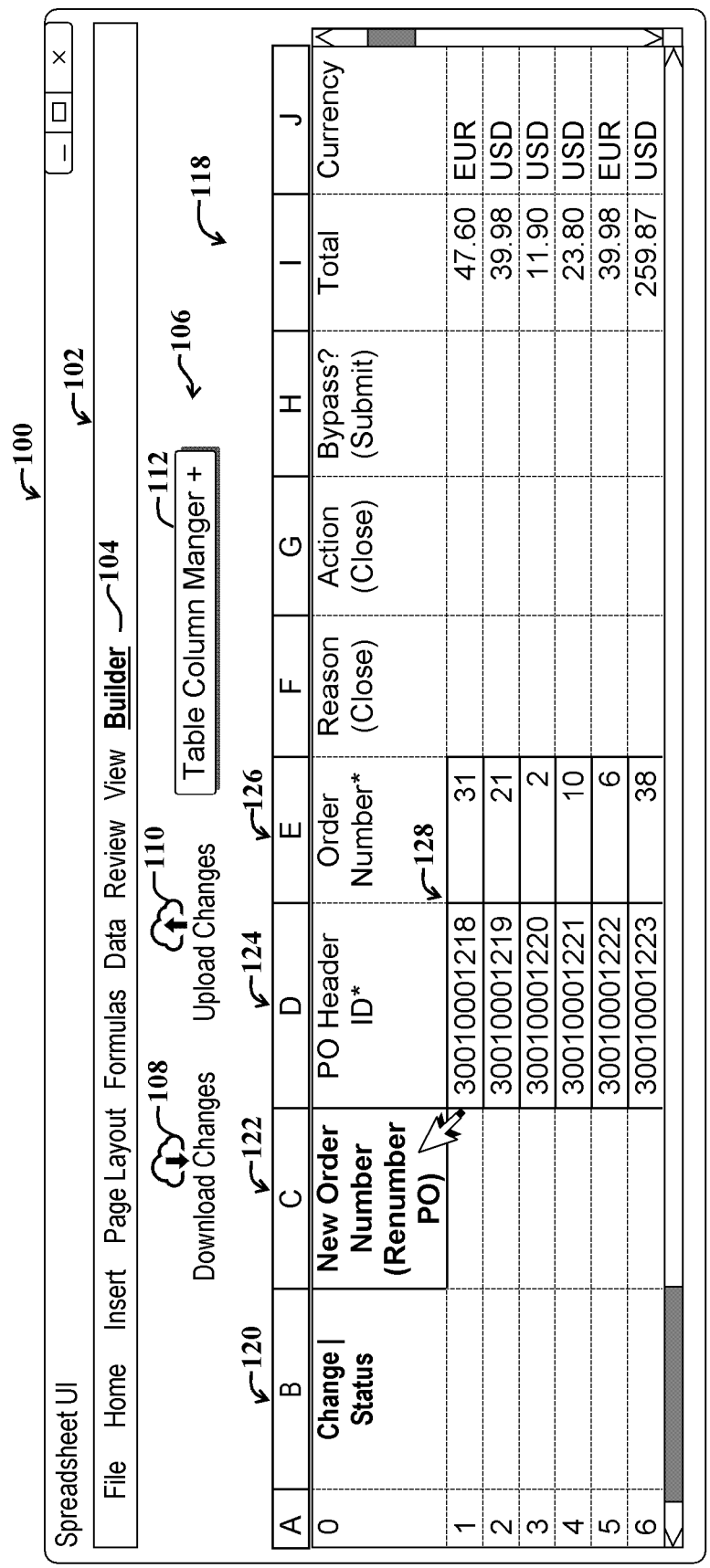
FIG. 3 illustrates a second example UI display screen showing an example spreadsheet layout after data has been downloaded from the server system of FIG. 1 to populate the spreadsheet layout, and which has been updated to include columns of fields that are associated with a newly added custom action, as may be added via the first UI display screen of FIG. 2.

FIG. 3 illustrates a second example UI display screen 100 showing an example spreadsheet layout after data has been downloaded from the server system 14 and accompanying backend databases 46 of FIG. 1 to populate the spreadsheet 16 of FIG. 1 and accompanying second example UI display screen 100. The UI display screen 100 has been updated to include columns of fields 122, 126 that are associated with a newly added custom action, e.g., the action implemented via the renumber PO custom action web service 32 of FIG. 1 and selected via the renumber PO control 66 of FIG. 2.

The second example UI display screen 100 includes a menu bar 102 with various menus. Currently, a builder menu item 104 is selected, resulting in display of an associated ribbon 106 of UI controls for manipulating fields of the accompanying spreadsheet layout 118 and performing software actions implemented via the add-in 18 of FIG. 1. Example UI controls in the ribbon 106 include a download changes control 108, an upload changes control 110, and a table column manager control 112. Note that other UI controls may be included in the ribbon 106, e.g., UI controls for redrawing layouts, etc., without departing from the scope of the present teachings.

User selection of the table column manager control 112 causes display of a table column manager UI display screen, e.g., the first example UI display screen 50 of FIG. 2, whereby parameters for selected custom actions can be selected for subsequent display in the associated spreadsheet layout 118.

The first example spreadsheet layout 118 shows several columns (A-J), including a change/status column 120 for indicating what, if any, action associated with a web service is to be applied to the associated row, and/or a status, if any associated processing, i.e., action.

Currently, the user has not edited in a field of the spreadsheet layout 118 that is associated with any particular web service or associated action, or otherwise, the user has not marked certain rows for a particular action to be handled by a particular web service. This is indicated by the absence of information (currently) in fields of the change status/status column 120 (column B in the present example embodiment).

A new order number column 122 (column C) includes fields that are associated with the Renumber PO web service 32 of FIG. 1; indicated by the renumber PO control 66 and associated sub-control 74 of FIG. 2; and as indicated in parenthesis of a header of the new order number column 122.

As a visual indicator, when a new order number header of the new order number column 122 is selected, and/or when a field associated therewith is selected, a block of fields 128 associated with the new order number column 122 and associated renumber PO custom (e.g., corresponding to the renumber PO web service 32 of FIG. 1, and as indicated in parenthesis of the header of the second column 122) action are highlighted in the spreadsheet layout 118. Other fields may be "whited out."

If a user begins to type an entry in a field of the new order number column 122, the associated new order number parameter (e.g., the parameter 86 of FIG. 2) will be populated with the entry, and the row will be simultaneously marked for the renumber PO custom action to be implemented via the PO custom action web service 32 of FIG. 1, as discussed more fully below. Furthermore, the entry will be used as input to drive the renumber PO custom action web service 32 and accompanying logic upon user selection of the upload changes control 110 of the ribbon 106, as discussed more fully below.

Note that other columns (F-H) are associated with other custom actions, e.g., a close action implemented via the close PO web service 30 of FIG. 1 is associated with columns F and G, and a submit action implemented via the submit PO web service 28 of FIG. 1 is associated with column H. Note that fields of columns F and G correspond to parameters of the close PO action, as indicated by the close PO sub-controls 76, 78 of FIG. 2. Similarly, fields of column H correspond to or represent parameters of the submit PO custom action, as indicated by the bypass sub-control 72 of FIG. 2.

Fields of columns I and J represent spreadsheet data. Accordingly, when a user modifies data in those columns, the associated row will be automatically marked (by the add-in 18 of FIG. 1) for the appropriate CRUD operation, e.g., will be marked for updating responsive to user selection of the upload changes 110 UI control of the ribbon 106.

Figure 4:
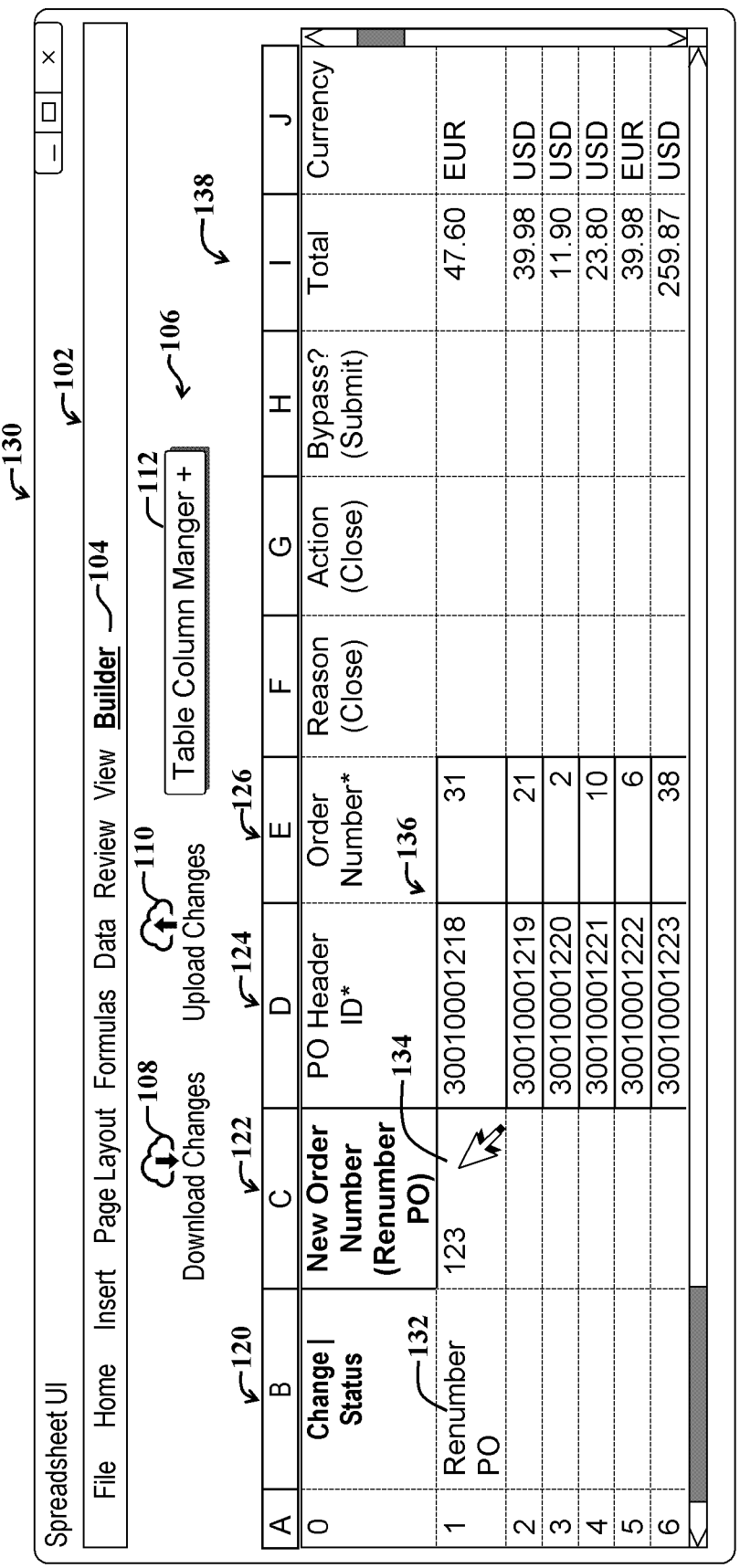
FIG. 4 illustrates a third example UI display screen showing that editing in a field associated with a custom action results in automatic creation of (via the add-in of FIG. 1) an indicator showing which custom action is to apply to the particular row of data associated with the edited field upon activation of an upload button.

FIG. 4 illustrates a third example UI display screen 130 showing that editing in a field, e.g., a new order number field 134, of the new order number column 122 associated with a custom action (e.g., the renumber PO custom action web service 32 of FIG. 1) results in automatic creation of (via the add-in 18 of FIG. 1) an indicator (e.g., a renumber PO indicator 132 in the change/status column 120) showing which custom action is to apply to the particular row (e.g., row 1) of data associated with the edited field 134 upon activation of the upload button 110 in the ribbon 106.

Note that the third example UI display screen 130 is similar to the second example UI display screen 100 of FIG. 3, but where the first example spreadsheet layout 118 shown in FIG. 3 has been replaced with an updated second spreadsheet layout 138.

In the second spreadsheet layout 138 a user has entered "123" in the new order number field 134. The add-in 18 of FIG. 1 then automatically detects that the new order number field 134 is associated with the renumber PO custom action 32 of FIG. 1, and then adds a corresponding renumber PO indicator 132 in the change/status column 120.

Accordingly, after providing an entry in the new order number field 134, the renumber PO indicator 132 appears in the change/status column 120. Note that the custom action (renumber PO) associated with the new order number parameter is indicated in parenthesis of a header of the new order number column 122.

Accordingly, different web services for implementing different custom actions may require different input parameters. The input parameters may now be harvested from the spreadsheet 18 of FIG. 1 and associated spreadsheet layout (s) 138 of FIG. 2 upon user selection of the upload changes UI control 110. The add-in 18 of FIG. 1 provides additional intelligence for detecting when data is modified or entries are made to fields associated with a particular custom action, where the particular custom action is in turn associated with a web service that enables access (by the spreadsheet 16 of FIG. 1) to functionality associated with the web service.

Note that the download changes UI control 108 is used to populate the second spreadsheet layout 138 with data (e.g., using a retrieve CRUD operation) from the business object data model 42 via the CRUD operations web service 38 of FIG. 1. Other UI controls, such as a "redraw layout" control may also be provided in the ribbon 106, without departing from the scope of the present teachings. In addition, or alternatively, another UI control for redrawing layouts may be provided elsewhere, e.g., via one or more right-click menus, etc.

Figure 5:
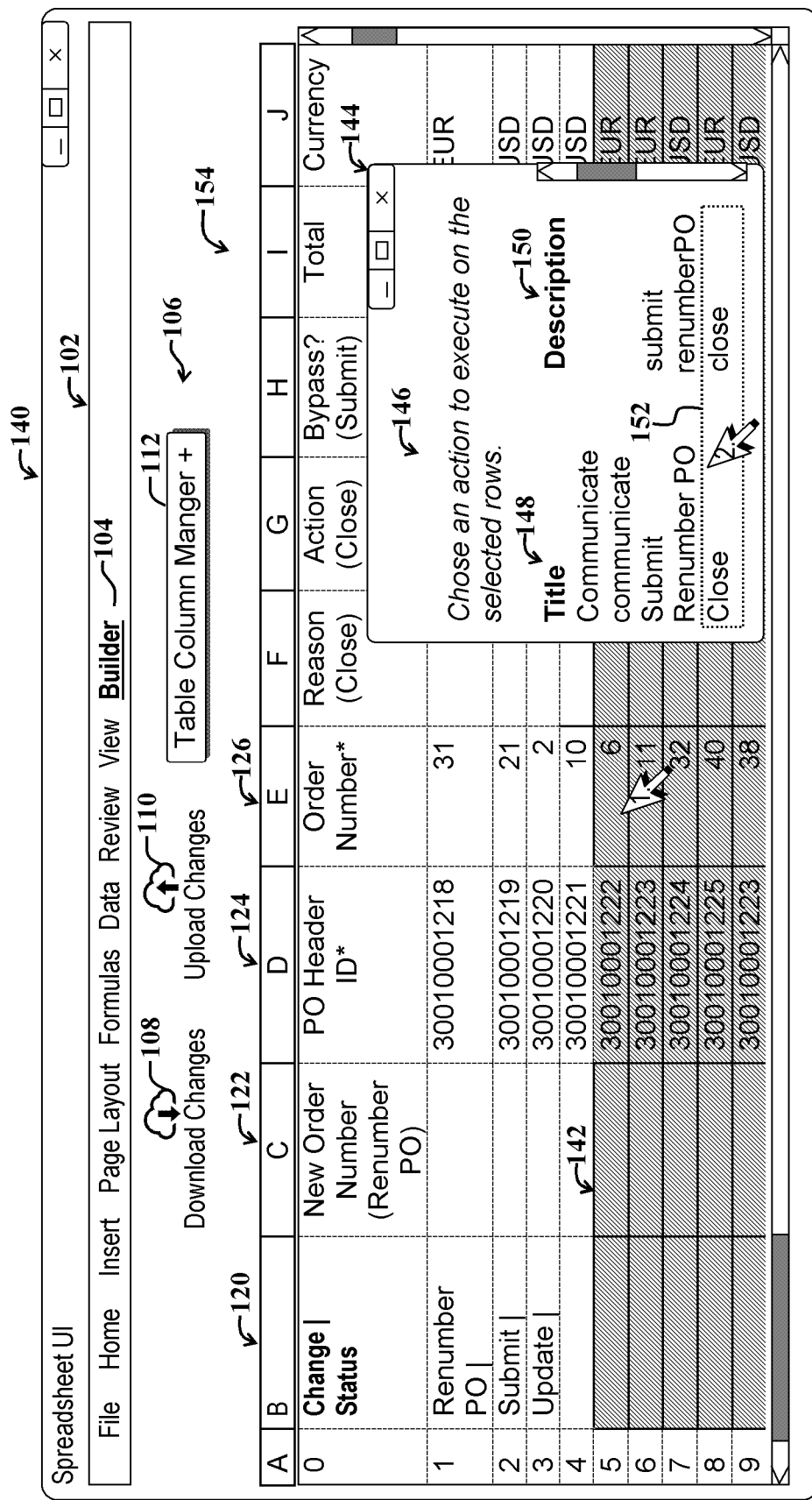
FIG. 5 illustrates a fourth example UI display screen showing bulk selection of spreadsheet rows and marking of the rows for a particular custom action.

FIG. 5 illustrates a fourth example UI display screen 140 showing bulk selection of spreadsheet rows and marking of the rows (e.g., selected rows 142, corresponding to row numbers 5-9) for a particular custom action.

The fourth example UI display screen 140 is similar to the third example UI display screen 130 of FIG. 4, but where the second spreadsheet layout 138 of FIG. 4 has been updated, resulting in an updated spreadsheet layout 154 in FIG. 5. In the updated spreadsheet layout 154, the user has selected a block of rows 142. Furthermore, a user has activated an action-selection UI display screen 144, e.g., via predetermined mouse gesture (or other UI control) on the selected rows 142.

The resulting action-selection UI display screen 144 provides various UI controls 146 for selecting one or more custom actions to apply to the selected rows 142. Example available actions are indicated in a title section 148 and are accompanied by corresponding descriptions in a description column 150.

In the present example embodiment, a user has chosen to apply a close PO custom action to the selected rows 142, as indicated by a close selection 152. Upon exiting the action-selection menu 144 the third spreadsheet layout 154 will be redrawn (either automatically, or responsive to user selection of a "redraw" UI control) to show that the rows (i.e., rows 5-9) in the selected block 142 have been marked for the close PO custom action associated with the close PO web service 30 of FIG. 1, as discussed more fully below.

Accordingly, users have multiple ways to mark rows for particular custom actions, including editing a particular field or cell that has been associated with a custom action; by selecting one or more rows and marking them for a particular action; and by copying and pasting rows (including pasting individual rows or selections of rows and/or pasting multiple copies of the individual rows or collections of rows) that have already been marked for one or more actions.

FIG. 6 illustrates a fifth example UI display screen 160 showing a bulk copy and paste operation, where a custom action (e.g., the action associated with the close PO web service 30 of FIG. 1) that is associated with one or more particular rows can be applied to other rows using a copy and paste operation.

For example, the field contents of row 5, column F and/or G, can be pasted into rows 6-9, thereby causing rows 6-9 to be marked for the same custom action (e.g., the close PO action) as row 5. This is different than the bulk operation discussed with reference to FIG. 5, which involved bulk marking, as opposed to a copy and paste operation.

In FIG. 5, note that the block of rows 142 that were selected and marked for the close PO custom action, are subsequently updated to indicate that the associated rows have been marked for the close PO custom action, e.g., the close PO action, as indicated in the corresponding fields of the change/status column 120.

However, in FIG. 6, the rows may have been marked for the close PO custom action another way. For instance, the user may have edited a reason field (that is associated with the close PO custom action as indicated in parenthesis of the header of column F) of row 5 (e.g., by entering "per Larry" in the reason field of row 5, which then results in automatic marking of row 5 for the close PO custom action); then performed a multi-cell paste operation (e.g., via "paste special" functionality of the underlying spreadsheet 16 of FIG. 1) to simultaneously populate and mark rows 6-9 for the close operation by populating the accompanying fields for the close PO action, as indicated in the block of fields 162.

Accordingly, embodiments herein facilitate bulk operations, including bulk selection of rows (e.g., selection of multiple rows) and marking of rows, applicable data of which is to be used for a selected custom action on those rows (i.e., using input from those rows), and including automatic sensing of an action to apply to a particular row based on entries in fields thereof that have been previously associated with the particular action.

Upon submittal of an associated fourth updated layout 168 (e.g., responsive to user selection of the upload changes UI control 110), the rows 1-9 (and any additional rows not shown) are submitted to the web service 24 of FIG. 1 for implementation of the associated actions. The status of each action will then be returned and subsequently shown in the change/status column 120.

This simultaneous submission of input data (from spreadsheet cells) to web services (for implementing custom actions or other arbitrary logic) can create substantial efficiencies, by facilitating use of server-side functionality and associated web services 24 of FIG. 1, as driven from data input via the spreadsheet 16 of FIG. 1. Furthermore, the user has access to preexisting functionality in the spreadsheet 16, such as producing graphs and other visualizations, which may provide further insight and user flexibility to visualize and decide what actions should be applied to what rows. Such features and functionality can be particularly useful when users are working with very large spreadsheet layouts, which may include thousands of rows.

Figure 7:
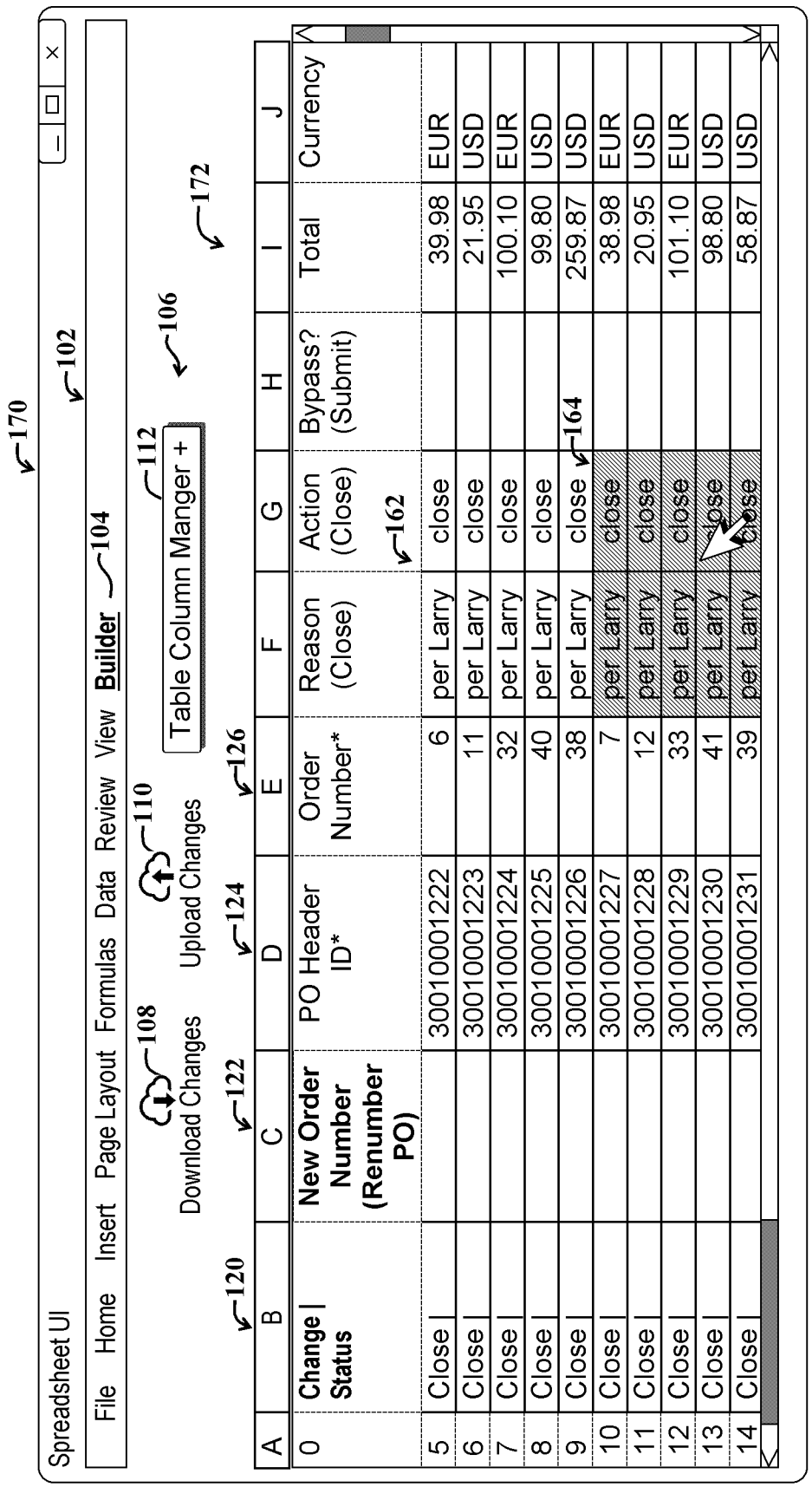
FIG. 7 illustrates a sixth example UI display screen showing example of results of a bulk paste operation.

FIG. 7 illustrates a sixth example UI display screen 170 showing example of results of a bulk paste operation in a fifth updated layout 172.

With reference to FIG. 6 and FIG. 7, the user has selected a block of columns 162 marked for the close PO action in FIG. 6, and has pasted them into rows 11-14, resulting in a block of pasted rows 164, which are automatically marked for the close PO action, as indicated in the change/status column 120.

Note that if instead of editing in a reason field (column F), the user had edited in a standard data field (e.g., columns I, J), then the rows 5-14 may have instead been automatically marked for an update operation (a CRUD operation) for handling via the data integration module 22 of the add-in 18 of FIG. 1.

Figure 8:
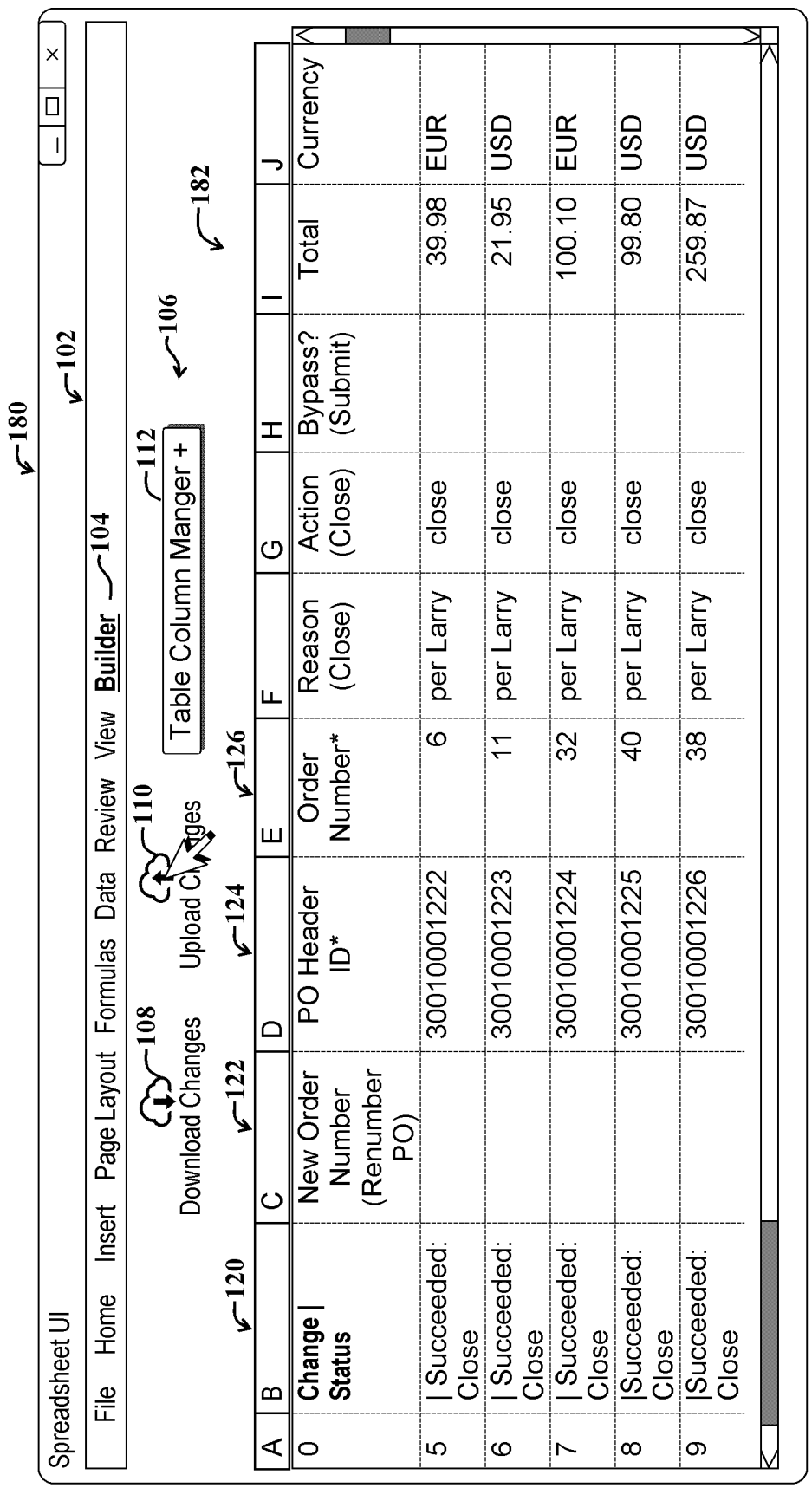
FIG. 8 illustrates a seventh example UI display screen illustrating a resulting status of the custom action (and/or CRUD operation) associated with each applicable row of the spreadsheet, and after an upload button has been selected, and after attempts to implement actions for each row have been completed.

FIG. 8 illustrates a seventh example UI display screen 180 illustrating a resulting status (e.g., as shown in the change/status column 120) of the custom action and/or CRUD operation associated with each applicable row of the spreadsheet, and after an upload button has been selected, and after attempts to implement actions for each row have been completed.

In the present example embodiment, a sixth updated layout 182 has been updated to illustrate that the close PO custom action applied to each row (e.g., rows 5-9) has succeeded, after the user invoked the associated actions via user selection of the upload changes UI control 110 of the ribbon 106. If one of the operations had not succeeded, the corresponding field of the change/status column 120 would indicate such.

Figure 9:
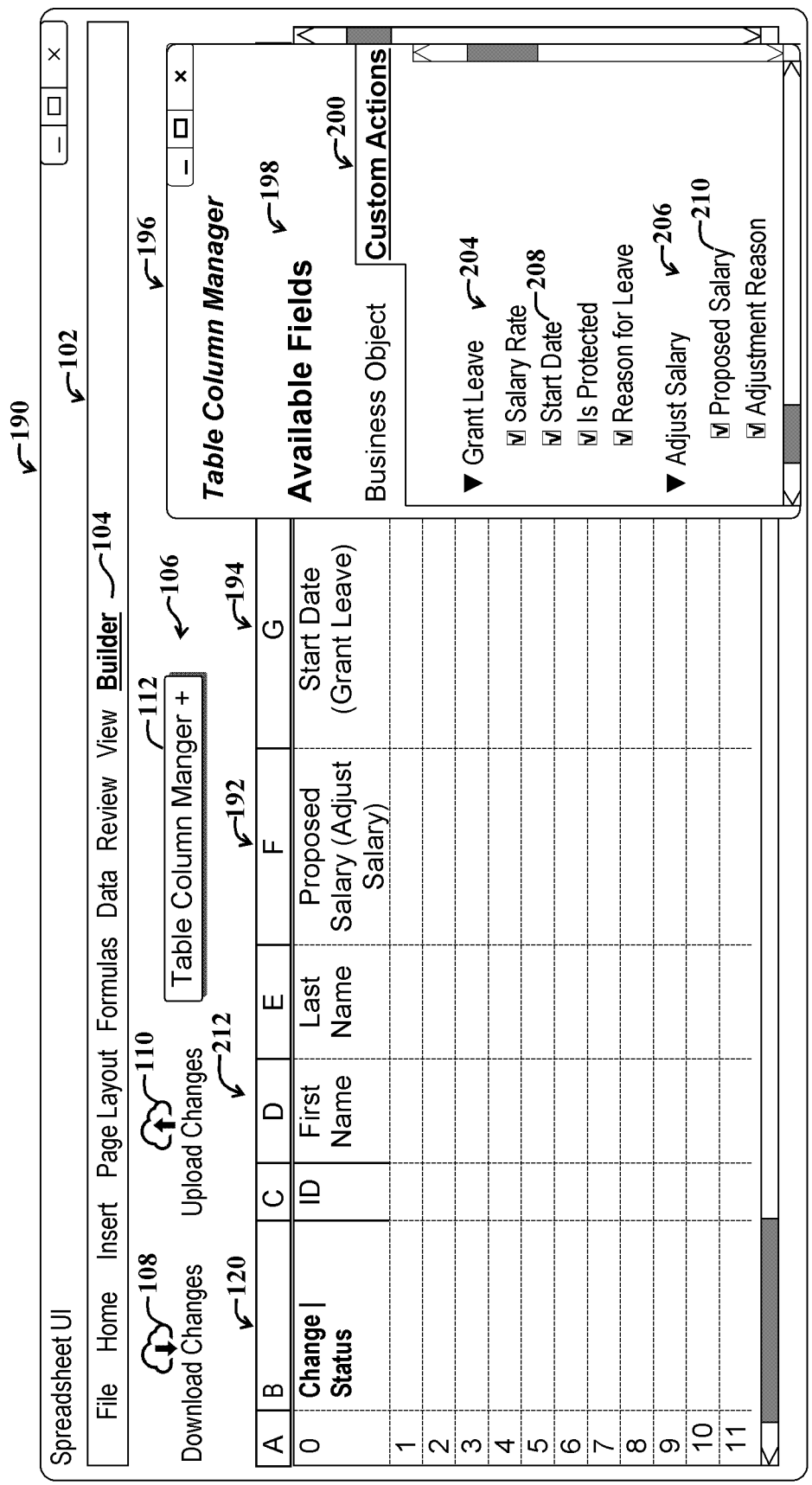
FIG. 9 illustrates an eighth example UI display screen, where an example custom action, e.g., an adjust salary action, is selected for use in a spreadsheet, and wherein the adjust salary action includes use of a server-side process-based software application.

FIG. 9 illustrates an eighth example UI display screen 190, where an example custom action, e.g., an adjust salary action (e.g., corresponding to the adjust salary web service 36 of FIG. 1) is selected for use in a new spreadsheet layout 212, and wherein the adjust salary action includes use of a server-side process-based software application.

In the present example embodiment, a user has activated a table column manager UI display screen 196, showing various available-fields 198 and UI controls 204-210 for adding custom actions and associated fields to the underlying spreadsheet layout 212. In the present example embodiment, the user has selected a grant leave custom action, as indicated by a grant leave UI control 204 and accompanying selections of grant leave sub-controls corresponding to parameters that the grant leave action takes as input.

For illustrative purposes, the new spreadsheet layout 212 shows a start date column 194 with fields associated with the grant leave custom action, as indicated by user selection of a start date sub-control 208 of the grant leave UI control 204 in a custom actions section 200 of the table column manager UI display screen 196. Note that updating of the underlying spreadsheet layout 212 responsive to user selections in the table column manager UI display screen 196 may occur approximately simultaneously with the selections, or upon closing of the table column manager UI display screen 196, or after closing of the table column manager UI display screen 196 and after a redrawing of the underlying spreadsheet layout 21.

Similarly, for illustrative purposes, a proposed salary column 192 has been added to the underlying spreadsheet layout 212 with fields that are associated with an adjust salary custom action, as indicated via selection of a proposed salary sub-control 210 of the adjust salary UI control of the table column manager UI display screen 196.

Note that, depending upon the specific implementation, e.g., custom implementation, the grant leave custom action and associated process, and the adjust salary custom action and associated process, may be process-based software applications with multiple approval steps. Server-side functionality, e.g., as implemented via one or more of the web services 44 of FIG. 1 facilitate implementing the functionality and providing access thereto by the client-side spreadsheet 16 of FIG. 1 via the add-in 18 and accompanying custom action interfacing module 20 thereof.

Figure 10:
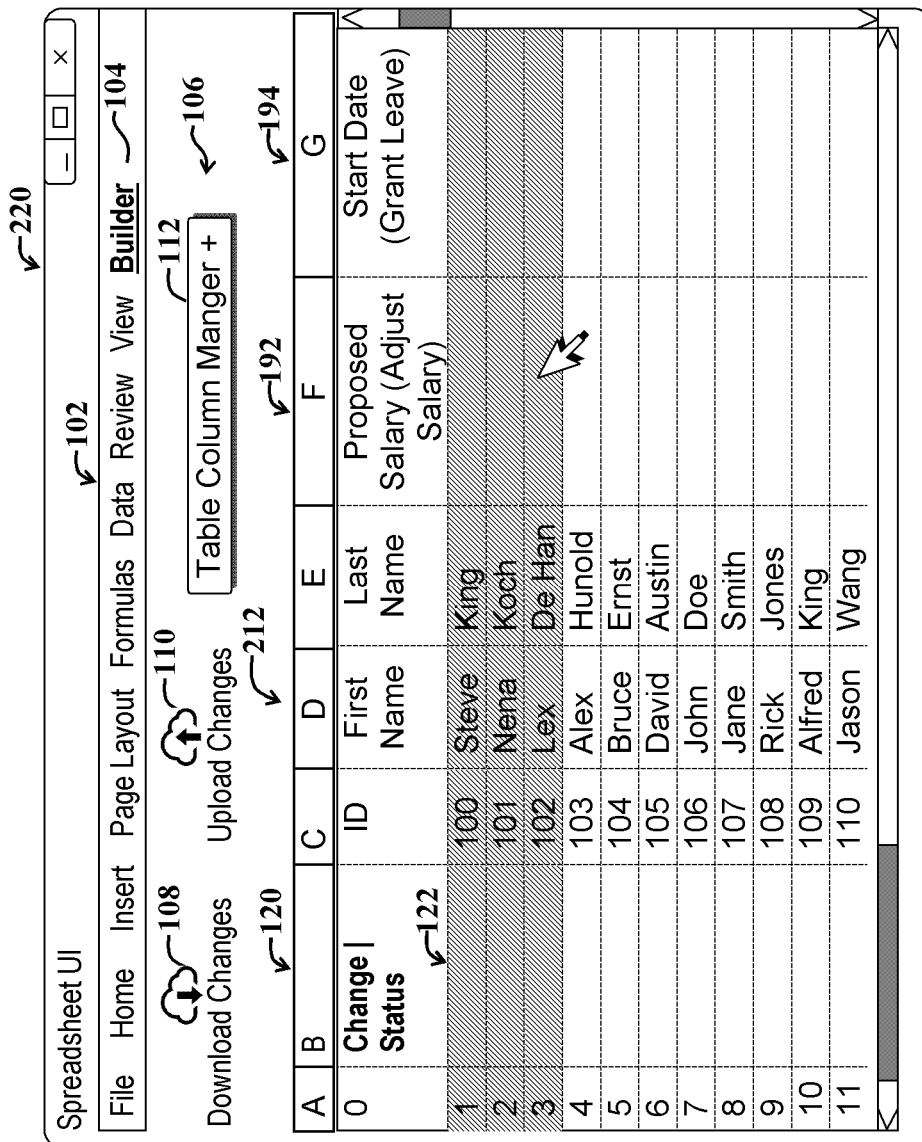
FIG. 10 illustrates a ninth example UI display screen showing updated columns after the adjust salary action has been added to the underlying spreadsheet, and after the spreadsheet has been populated with data, e.g., after a download button or other UI control has been selected.

FIG. 10 illustrates a ninth example UI display screen 220 showing updated columns (including columns C-E), after the adjust salary action has been added to the underlying spreadsheet (as indicated by the proposed salary column 192), and after the underlying spreadsheet layout 212 has been populated with data, e.g., after user selection of the download button 108 or other applicable UI control.

For illustrative purposes, the user has selected a block 122 of the first three rows (rows 1-3) of data in preparation for marking the rows for a custom action, e.g., a grant leave action, adjust salary action, or other action.

Figure 11:
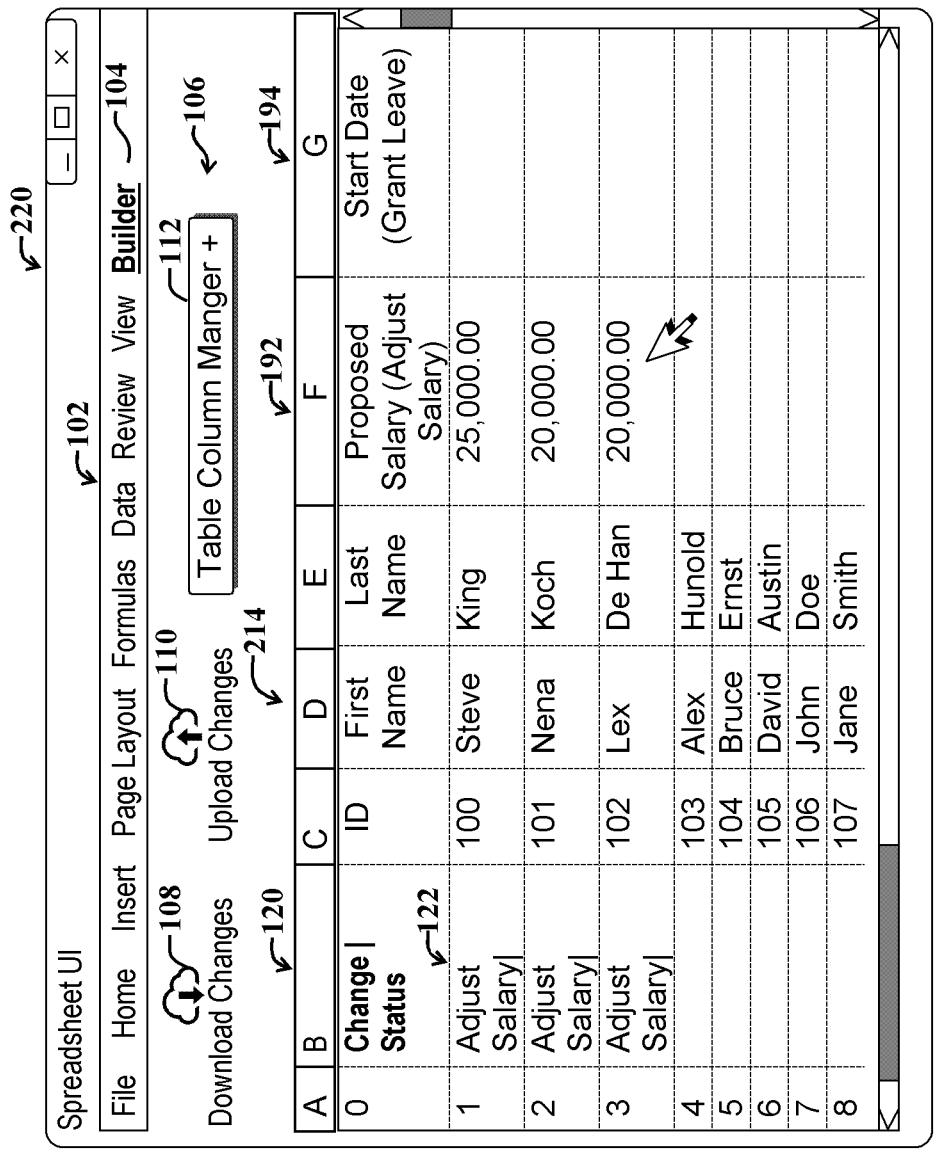
FIG. 11 illustrates a tenth example UI display screen showing the spreadsheet of FIG. 11 after proposed salary amounts have been entered in fields associated with the adjust salary action, and after a set of rows have been marked to be processed by the adjust salary action.

FIG. 11 illustrates a tenth example UI display screen 220 showing an adjusted spreadsheet layout 214 the spreadsheet layout 212 of FIG. 11 after proposed salary amounts have been entered in fields associated with the adjust salary action (as indicated in a proposed salary column 192), and after a block of rows 122 (rows 1-3) have been marked to be processed by the adjust salary action. The marking of the rows 1-3 in the block of rows 122 for the adjust salary action is illustrated in corresponding fields of the change/status column 120.

Figure 12:
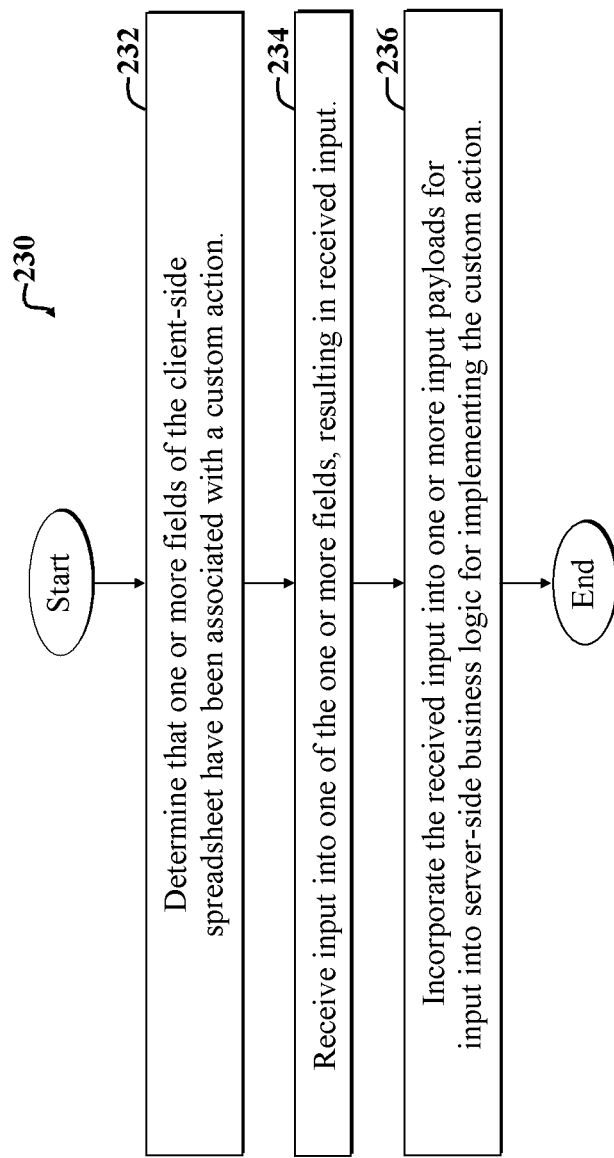
FIG. 12 is a flow diagram of a first example method suitable for use with the embodiments of FIGS. 1-11.

FIG. 12 is a flow diagram of a first example method 230 suitable for use with the embodiments of FIGS. 1-11. The first example method 230 employs a client-side spreadsheet to leverage (i.e., take advantage of), via a spreadsheet add-in (e.g., the add-in 18 of FIG. 1), server-side software functionality (e.g., functionality implemented via the web services 24 and accompanying server-side logic 44 of FIG. 1.

The first example method includes a first determining step 232, which involves determining that one or more fields of the client-side spreadsheet have been associated with a custom action.

Next, a receiving step 234 includes receiving input into one of the one or more fields (e.g., a user-supplied entry, such as the "123" entry provided in the order number field 134 of FIG. 4), resulting in received input.

Finally, an incorporating step 236 includes incorporating the received input into one or more input payloads (e.g., via the custom action interfacing module 20 of the spreadsheet add-in 18 of FIG. 1) for subsequent input into server-side business logic (e.g., the server-side logic 44 of FIG. 1) for implementing the custom action (e.g., the renumber PO action accessible via the renumber PO web service 32 of the server-side logic 44 of FIG. 1).

Note that the first example method 230 may be altered, e.g., augmented or otherwise changed, without departing from the scope of the present teachings. For example, the first example method 230 may further specify a step of implementing the server-side business logic via one or more web services or APIs (e.g., the web services 24 or APIs 24 of FIG. 1).

The business logic may specify one or more custom actions to be implemented via the one or more web services. Performing the one or more custom actions may involve launching a server-side process-based software application, such as an approval process, e.g., a process for submitting a purchase order, adjusting the salary of an employee, or other process.

The first example method 230 may further specify a step of using a client-side spreadsheet add-in to package and submit one or values in the one or more fields as one or more input parameters to the one or more web services. The server-side business logic may be invoked by (or started responsive to) the submittal the one or more input parameters to the one or more web services via the add-in.

The first example method 230 may further specify a step of displaying one or more indications of results of processing (e.g., an indicator specifying whether or not a custom action process has succeeded or failed) by the server-side business logic after the server-side business logic completes operations in response to receipt of the one or more input parameters.

The first example method 230 may further specify a step of providing a first user option via one or more UI controls for selecting multiple rows of the spreadsheet, and then simultaneously submitting data in the multiple rows as input to one or more web services implementing one or more custom actions. A second user option enables users to simultaneously mark plural rows for use with a custom action of the one or more custom actions. A third user option involves having the accompanying add-in sense context information, and then automatically mark a row of the spreadsheet for use with a specific custom action based upon one or more properties (e.g., properties specifying what custom action a field is associated with) of a field that a user selects to perform data entry.

Figure 13:
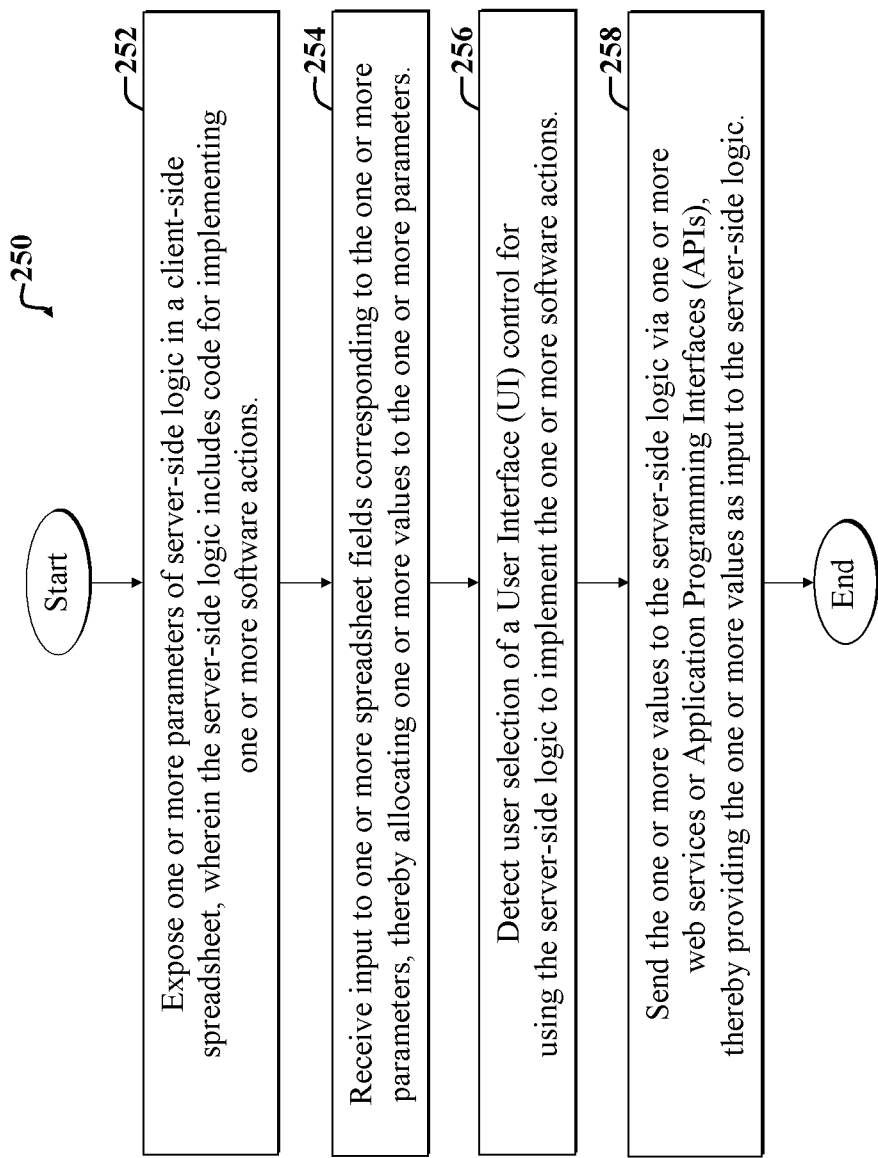
FIG. 13 is a flow diagram of a second example method suitable for use with the embodiments of FIGS. 1-12.

FIG. 13 is a flow diagram of a second example method 250 suitable for use with the embodiments of FIGS. 1-12. The second example method 250 facilitates extending client-side software functionality to leverage (i.e., make use of) server-side functionality.

A first step 252 includes exposing one or more parameters (e.g., parameters corresponding to sub-controls 70-78 in FIG. 2 and associated fields that subsequently appear in a spreadsheet layout, e.g., the spreadsheet layout 118 of FIG. 3) of server-side logic (e.g., the server-side logic 44 of FIG. 1) in a client-side spreadsheet (e.g., the spreadsheet 16 of FIG. 1), wherein the server-side logic includes code for implementing one or more software actions.

A second step 254 includes receiving input to one or more spreadsheet fields (e.g., input provided by a user of the spreadsheet) corresponding to the one or more parameters, and thereby by allocating one or more values to the one or more parameters.

A third step 256 includes detecting user selection of a UI control (e.g., the upload changes UI control 110 of FIG. 3) for using the server-side logic to implement the one or more software actions.

A fourth step 258 includes sending the one or more values to the server-side logic via a spreadsheet add-in (e.g., the add-in 18 of FIG. 1) and one or more web services, thereby providing the one or more values as input to the server-side logic.

Note that the second example method 250 may be modified, without departing from the scope of the present teachings. For example, the second example method 250 may further specify a step of determining whether or not the one or more software actions have been implemented in response to the sending, and displaying one or more indicators indicating a status of the one or more software actions based on the determining.

Accordingly, various embodiments discussed herein involve exposing parameters corresponding to arguments of server-side logic, in a spreadsheet; coupled with software mechanisms (e.g., the add-in 18 of FIG. 1) to select data from the spreadsheet; convert the data into appropriate input payloads that are then sent to corresponding server-side software functionality, e.g., server-side logic.

Generally embodiments enable users to take advantage of (i.e., leverage) functionality provided by web services, and to call those web services from a spreadsheet, while also leveraging existing functionality provided by the spreadsheet. In addition to standard CRUD operations, various embodiments may allow various rows to be marked (including marked in bulk) for other software actions, e.g., custom actions, to be invoked (including invoked in bulk) upon submittal of the corresponding fields to the corresponding web services or APIs.

Figure 14:
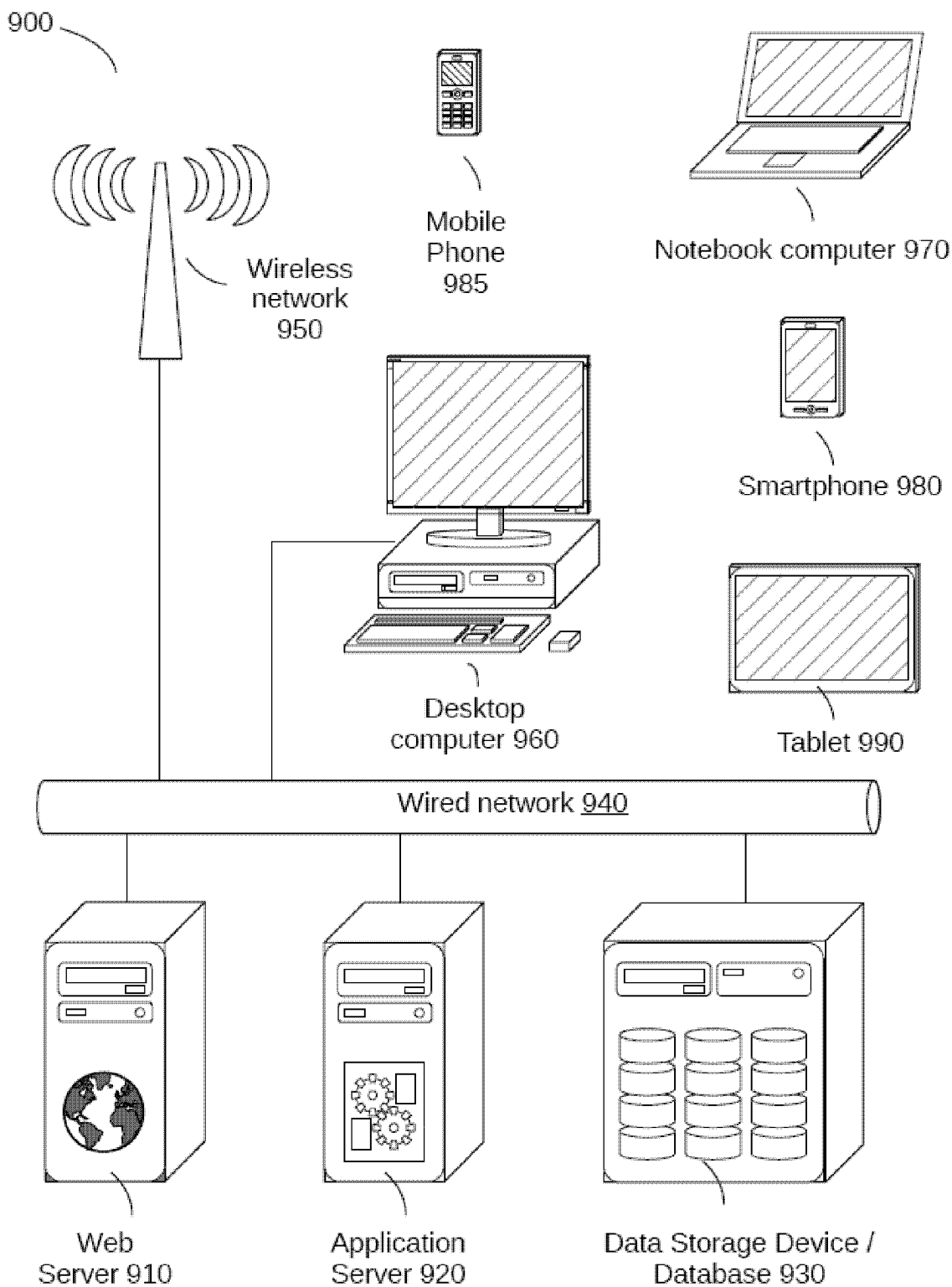
FIG. 14 illustrates a block diagram of an example network environment, which may be used for implementations described herein.

FIG. 14 is a general block diagram of a system 900 and accompanying computing environment usable to implement the embodiments of FIGS. 1-13. Embodiments may be implemented as standalone applications (for example, residing in a user device) or as web-based applications implemented using a combination of client-side and server-side code.

The general system 900 includes user devices 960-990, including desktop computers 960, notebook computers 970, smartphones 980, mobile phones 985, and tablets 990. The general system 900 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although the system 900 is shown with five user devices, any number of user devices can be supported.

A web server 910 is used to process requests from web browsers and standalone applications for web pages, electronic documents, enterprise data or other content, and other data from the user computers. The web server 910 may also provide push data or syndicated content, such as RSS feeds, of data related to enterprise operations.

An application server 920 operates one or more applications. The applications can be implemented as one or more scripts or programs written in any programming language, such as Java, C, C++, C #, or any scripting language, such as JavaScript or ECMAScript (European Computer Manufacturers Association Script), Perl, PHP (Hypertext Preprocessor), Python, Ruby, or TCL (Tool Command Language). Applications can be built using libraries or application frameworks, such as Rails, Enterprise JavaBeans, or .NET. Web content can created using HTML (HyperText Markup Language), CSS (Cascading Style Sheets), and other web technology, including templating languages and parsers.

The data applications running on the application server 920 are adapted to process input data and user computer requests and can store or retrieve data from data storage device or database 930. Database 930 stores data created and used by the data applications. In an embodiment, the database 930 includes a relational database that is adapted to store, update, and retrieve data in response to SQL format commands or other database query languages. Other embodiments may use unstructured data storage architectures and NoSQL (Not Only SQL) databases.

In an embodiment, the application server 920 includes one or more general-purpose computers capable of executing programs or scripts. In an embodiment, web server 910 is implemented as an application running on the one or more general-purpose computers. The web server 910 and application server 920 may be combined and executed on the same computers.

An electronic communication network 940-950 enables communication between user computing devices 960-990, web server 910, application server 920, and database 930. In an embodiment, networks 940-950 may further include any form of electrical or optical communication devices, including wired network 940 and wireless network 950. Networks 940-950 may also incorporate one or more local-area networks, such as an Ethernet network, wide-area networks, such as the Internet; cellular carrier data networks; and virtual networks, such as a virtual private network.

The system 900 is one example for executing applications according to an embodiment of the invention. In another embodiment, application server 920, web server 910, and optionally database 930 can be combined into a single server computer application and system. In a further embodiment, virtualization and virtual machine applications may be used to implement one or more of the application server 920, web server 910, and database 930.

In still further embodiments, all or a portion of the web and application serving functions may be integrated into an application running on each of the user computers. For example, a JavaScript application on the user computer may be used to retrieve or analyze data and display portions of the applications.

With reference to FIGS. 1 and 14, the client system(s) 12 of FIG. 1 may be implemented via one or more of the desktop computer 960, tablet 990, smartphone 980, notebook computer 970, and/or mobile phone 985 of FIG. 14. The server system 14 of FIG. 1 and accompanying modules 24, 44, 28-38 may be implemented via the web server 910 and/or application server 920 of FIG. 14. The network 16 of FIG. 1 may be implemented by the wireless network 950 and/or the wired network 940 of FIG. 14. The backend databases 46 of FIG. 1 may be implemented using the data storage device 930 of FIG. 14.

Figure 15:
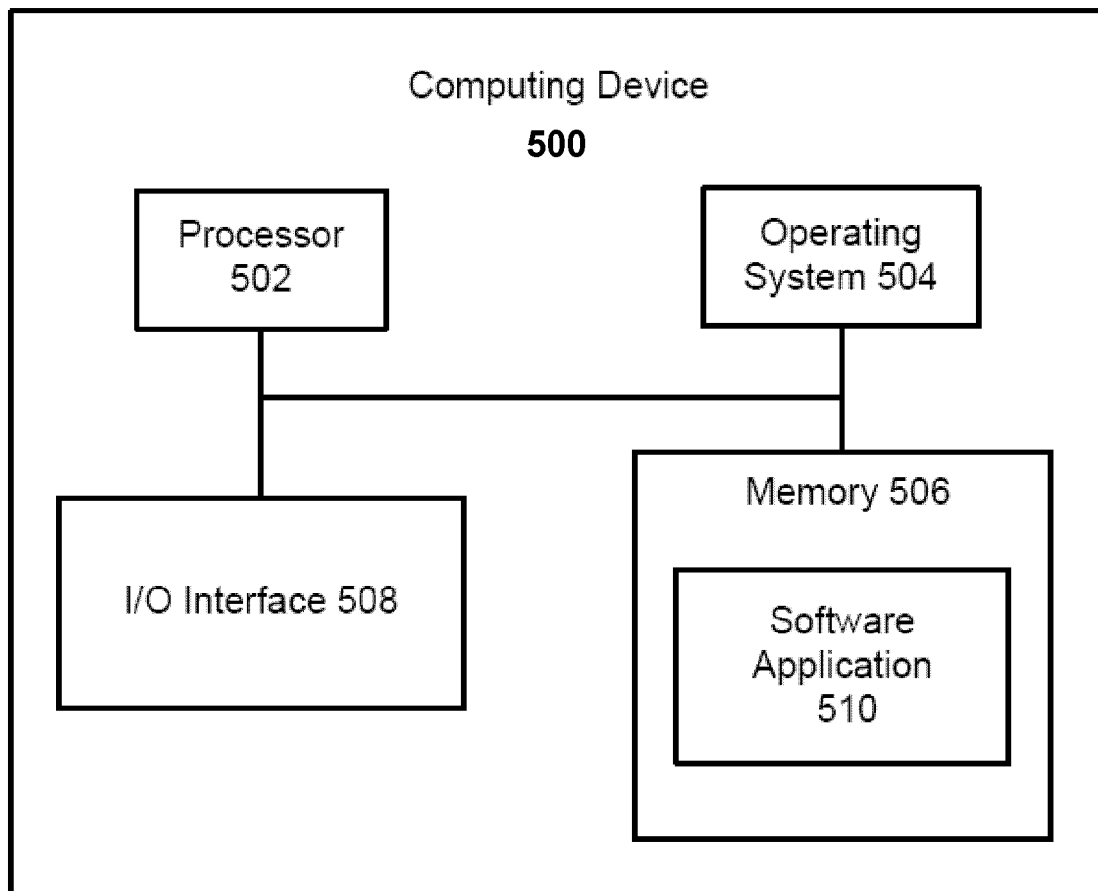
FIG. 15 illustrates a block diagram of an example computing device or system, which may be used for implementations described herein.

FIG. 15 illustrates a block diagram of an example computing device or system 500, which may be used for implementations described herein. For example, the computing device 500 may be used to implement server devices 910, 920 of FIG. 14 as well as to perform the method implementations described herein. In some implementations, the computing device 500 may include a processor 502, an operating system 504, a memory 506, and an input/output (I/O) interface 508.

In various implementations, the processor 502 may be used to implement various functions and features described herein, as well as to perform the method implementations described herein. While the processor 502 is described as performing implementations described herein, any suitable component or combination of components of the computing device 500 or any suitable processor or processors associated with the device 500 or any suitable system may perform the steps described. Implementations described herein may be carried out on a user device, on a server, or a combination of both.

The example computing device 500 also includes a software application 510, which may be stored on memory 506 or on any other suitable storage location or computer-readable medium. The software application 510 provides instructions that enable the processor 502 to perform the functions described herein and other functions. The components of computing device 500 may be implemented by one or more processors or any combination of hardware devices, as well as any combination of hardware, software, firmware, etc.

For ease of illustration, FIG. 15 shows one block for each of processor 502, operating system 504, memory 506, I/O interface 508, and software application 510. These blocks 502, 504, 506, 508, and 510 may represent multiple processors, operating systems, memories, I/O interfaces, and software applications. In various implementations, the computing device 500 may not have all of the components shown and/or may have other elements including other types of components instead of, or in addition to, those shown herein.

Although the description has been described with respect to particular embodiments thereof, these particular embodiments are merely illustrative, and not restrictive. For example, while various embodiments have been discussed with reference to client-side spreadsheets, such as Microsoft Excel, embodiments are not limited thereto. For instance, those skilled in the art may readily adapt embodiments discussed herein for use with other client-side software, e.g., accounting software, databases, and so on, without departing from the scope of the present teachings.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a non-transitory medium such as a hardware storage device can be used to store the control logic, which can include executable instructions.

Particular embodiments may be implemented by using a programmed general purpose digital computer, by using application specific integrated circuits, programmable logic devices, field programmable gate arrays, optical, chemical, biological, quantum or nanoengineered systems, etc. Other components and mechanisms may be used. In general, the functions of particular embodiments can be achieved by any means as is known in the art. Distributed, networked systems, components, and/or circuits can be used. Cloud computing or cloud services can be employed. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

It will also be appreciated that any of the methods described above can be performed by an apparatus comprising one or more means. For example, an apparatus may be provided for facilitating communications between a client-side program and server-side software. The apparatus may comprise: means for receiving a signal from a client-side program to communicate with server-side software; means for interrogating the server-side software for authentication-method information; means for using the authentication-method information to authenticate the client-side program for interaction with the server-side software; and means for enabling communications between the client-side program and the server-side software using an authentication method specified by the authentication-method information. Other steps in the methods described above can also be performed by one or more means in the apparatus. Here, the apparatus may be implemented in software, such as the add-in 18 in FIG. 1, and the means may be implemented as program modules in the software.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A non-transitory processor-readable medium including instructions executable by one or more processors, and when executed operable for:
   associating server-side custom actions with data fields that are associated with multiple rows of a client-side spread sheet, wherein the server-side custom actions are defined by one or more web services;
   receiving input into the data fields associated with the multiple rows of the client-side spread sheet;
   transmitting the input from the data fields associated with the multiple rows in a single request to the one or more web services;
   receiving results of the server-side custom actions;
   displaying the results in the client-side spread sheet;
   accessing online documentation specifying accepted input payload information from at least one of the one or more web services; and
   in response to the receiving input into the data fields, using the accepted input payload information to selectively package the received input into one or more input payloads that are input into and drive behavior of the server-side custom actions.

2. The non-transitory processor-readable medium of claim 1, wherein the multiple rows includes thousands of rows.

3. The non-transitory processor-readable medium of claim 1, wherein the one or more web services includes multiple web services, and wherein the non-transitory processor-readable medium further includes:
   simultaneously launching multiple web services; and
   transmitting the input from the data fields in the single request to the multiple web services that were simultaneously launched.

4. The non-transitory processor-readable medium of claim 1, further including:
   providing copy-and-paste features with the client-side spread sheet.

5. The non-transitory processor-readable medium of claim 1, further comprising:
   associating the client-side spread sheet with a business object data model that provides information about data objects of the client-side spread sheet to server-side logic.

6. The non-transitory processor-readable medium of claim 5, further comprising:
   determining, based on the information, what data objects can be operated on in view of log-in credentials and associated permissions.

7. The non-transitory processor-readable medium of claim 1, further comprising:
   exposing one or more parameters in the client-side spread sheet, wherein the one or more parameters are for server-side logic and wherein the server-side logic includes code for implementing the server-side custom actions.

8. The non-transitory processor-readable medium of claim 1, further comprising:
   detecting user selection of a user interface control for using the server-side logic; and
   implementing the server-side custom actions in response to the detecting of the user selection of the user interface control.

9. The non-transitory processor-readable medium of claim 1, further comprising:
   associating a first server-side custom action with a first data field of a first row of the client-side spread sheet;
   associating a second server-side custom action with a second data field of a second row of the client-side spread sheet;
   receiving input into the first and second data fields of the client-side spread sheet; and
   transmitting the input from the first and second data fields in the single request to the one or more web services.

10. A method for providing bulk server-side custom actions for multiple rows of a client-side spread sheet, the method comprising:
    associating server-side custom actions with data fields that are associated with multiple rows of a client-side spread sheet, wherein the server-side custom actions are defined by one or more web services;
    receiving input into the data fields associated with the multiple rows of the client-side spread sheet;
    transmitting the input from the data fields associated with the multiple rows in a single request to the one or more web services;
    receiving results of the server-side custom actions;
    displaying the results in the client-side spread sheet;
    accessing online documentation specifying accepted input payload information from at least one of the one or more web services; and
    in response to the receiving input into the data fields, using the accepted input payload information to selectively package the received input into one or more input payloads that are input into and drive behavior of the server-side custom actions.

11. The method of claim 10, wherein the multiple rows includes thousands of rows.

12. The method of claim 10, wherein the one or more web services includes multiple serv services and wherein the method further including:
    simultaneously launching the multiple web services; and
    transmitting the input from the data fields in the single request to the multiple web services that were simultaneously launched.

13. The method of claim 10, further including:
    providing copy-and-paste features with the client-side spread sheet.

14. The method of claim 10, further comprising:
    associating the client-side spread sheet with a business object data model that provides information about data objects of the client-side spread sheet to server-side logic.

15. The method of claim 14, further comprising:
    determining, based on the information, what data objects can be operated on in view of log-in credentials and associated permissions.

16. The method of claim 10, further comprising:
    exposing one or more parameters in the client-side spread sheet, wherein the one or more parameters are for server-side logic and wherein the server-side logic includes code for implementing the server-side custom actions.

17. The method of claim 10, further comprising:
    detecting user selection of a user interface control for using the server-side logic; and
    implementing the server-side custom actions in response to the detecting of the user selection of the user interface control.

18. An apparatus comprising:
    one or more processors; and
    logic encoded in one or more non-transitory media for execution by the one or more processors and when executed operable for:
    associating server-side custom actions with data fields that are associated with multiple rows of a client-side spread sheet, wherein the server-side custom actions are defined by one or more web services;
    receiving input into the data fields associated with the multiple rows of the client-side spread sheet;
    transmitting the input from the data fields associated with the multiple rows in a single request to the one or more web services;
    receiving results of the server-side custom actions;
    displaying the results in the client-side spread sheet;
    accessing online documentation specifying accepted input payload information from at least one of the one or more web services; and
    in response to the receiving input into the data fields, using the accepted input payload information to selectively package the received input into one or more input payloads that are input into and drive behavior of the server-side custom actions.

* * * * *